United States Patent
Teyeb et al.

(10) Patent No.: US 12,389,486 B2
(45) Date of Patent: Aug. 12, 2025

(54) SYNCHRONIZATION AND RANDOM ACCESS DURING CONNECTION RESUME

(71) Applicant: Telefonaktiebolaget LM Ericsson (PUBL), Stockholm (SE)

(72) Inventors: Oumer Teyeb, Montréal (CA); Icaro L. J. Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 395 days.

(21) Appl. No.: 17/795,993

(22) PCT Filed: Feb. 4, 2021

(86) PCT No.: PCT/SE2021/050079
§ 371 (c)(1),
(2) Date: Jul. 28, 2022

(87) PCT Pub. No.: WO2021/162605
PCT Pub. Date: Aug. 19, 2021

(65) Prior Publication Data
US 2023/0068134 A1  Mar. 2, 2023

Related U.S. Application Data

(60) Provisional application No. 62/976,186, filed on Feb. 13, 2020.

(51) Int. Cl.
*H04W 76/19* (2018.01)
*H04W 56/00* (2009.01)
(Continued)

(52) U.S. Cl.
CPC ....... *H04W 76/20* (2018.02); *H04W 56/0015* (2013.01); *H04W 76/15* (2018.02); *H04W 76/30* (2018.02)

(58) Field of Classification Search
CPC . H04W 76/27; H04W 76/20; H04W 74/0833; H04W 76/15; H04W 76/30; H04W 56/0015; H04W 74/0838
See application file for complete search history.

(56) References Cited

U.S. PATENT DOCUMENTS

2022/0287133 A1\* 9/2022 Hsieh .................... H04W 76/27
2022/0295364 A1\* 9/2022 Rugeland .......... H04W 36/0061
(Continued)

FOREIGN PATENT DOCUMENTS

WO  2019 245335 A1  12/2019

OTHER PUBLICATIONS

3GPP TSG-RAN WG2 Meeting #109; Athens, Greece; Change Request; Title: [108#28] [R16 RRC] 38331 Rel-16 CR Merge (R2-20xxxxx) [due to size, this document has been split into fourt parts]—Feb. 24-28, 2020.
(Continued)

*Primary Examiner* — Syed Ali
(74) *Attorney, Agent, or Firm* — Baker Botts L.L.P.

(57) ABSTRACT

According to some embodiments, a method performed by a wireless device capable of operating in dual connectivity with a first network node in a master cell group (MCG) and a second network node in a secondary cell group (SCG) comprises receiving a connection configuration message from the first network node. The message includes parameters for setup or modification of the SCG. The method further comprises: storing parameters for synchronization or random access with the second network node; operating in dual connectivity with the first and second network nodes; storing configuration information about the second network node received via system information; receiving a connection release message from the first network node; receiving a connection resume message from the first network node;
(Continued)

determining the message does not include a new or modified configuration for the SCG; and performing synchronization and random access with the second network node using the stored parameters.

6 Claims, 16 Drawing Sheets

(51) Int. Cl.
*H04W 76/15* (2018.01)
*H04W 76/20* (2018.01)
*H04W 76/30* (2018.01)

(56) References Cited

U.S. PATENT DOCUMENTS

| | | | | |
|---|---|---|---|---|
| 2022/0312354 A1* | 9/2022 | Teyeb | | H04W 76/27 |
| 2022/0312532 A1* | 9/2022 | Rugeland | | H04W 76/20 |
| 2022/0322182 A1* | 10/2022 | Lee | | H04W 36/0061 |
| 2022/0394572 A1* | 12/2022 | Wu | | H04W 76/15 |
| 2023/0164870 A1* | 5/2023 | Yi | | H04W 72/51 |
| | | | | 455/450 |
| 2023/0164871 A1* | 5/2023 | Jung | | H04W 24/08 |
| | | | | 370/328 |
| 2023/0189346 A1* | 6/2023 | Park | | H04W 76/27 |
| | | | | 370/329 |
| 2023/0217502 A1* | 7/2023 | Cirik | | H04W 74/0836 |
| | | | | 370/329 |
| 2024/0032135 A1* | 1/2024 | Cheng | | H04W 24/10 |

OTHER PUBLICATIONS

3GPP TSG-RAN WG2 Meeting #109 electronic; e-meeting; Source: ZTE Corporation; Title: Summary of MCG SCell and SCG confirmation with RRC resume (draft R2-2002026)—Feb. 24-Mar. 6, 2020.

PCT International Preliminmary Report on Patentability issued for International application No. PCT/SE2021/050079—Mar. 1, 2022.

3GPP TSG-RAN WG2 #107; Prague, Czech Republic; Source: Ericsson (Rapporteur); Title: Summary of email discussion [106#38] [NR/DCCA]: SCG and MCG SCell Configuration with RRC Resume (R2-1910291)—Aug. 26-30, 2019.

3GPP TSG-RAN WG2 Meeting #109-e; Electronic meeting; Source: viva; Title: Some remaining issues on SCG resume (R2-2000297)—Feb. 24-Mar. 6, 2020.

3GPP TSG-RAN WG2 #109-e; Electronic Meeting; Source: Ericsson; Title: Synchronization and random access to the PSCell during resume (R2-2001253)—Feb. 24-Mar. 6, 2020.

* cited by examiner

SYNCHRONIZATION AND RANDOM ACCESS DURING CONNECTION RESUME

PRIORITY

This nonprovisional application is a U.S. National Stage Filing under 35 U.S.C. § 371 of International Patent Application Serial No. PCT/SE2021/050079 filed Feb. 4, 2021 and entitled "SYNCHRONIZATION AND RANDOM ACCESS DURING CONNECTION RESUME" which claims priority to U.S. Provisional Patent Application No. 62/976,186 filed Feb. 13, 2020 both of which are hereby incorporated by reference in their entirety.

TECHNICAL FIELD

Embodiments of the present disclosure are directed to wireless communications and, more particularly, to synchronization and random access during connection resume.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

There are different ways to deploy a fifth generation (5G) wireless network with or without interworking with long term evolution (LTE) (also referred to as evolved universal terrestrial radio access (E-UTRA)) and evolved packet core (EPC), as illustrated in FIG. 1.

FIG. 1 illustrates six example network deployments for 5G and LTE interworking. Option 1 illustrates standalone LTE connected to EPC. Option 2 illustrates standalone NR connected to 5GCN, or NR-NR DC. Option 3 illustrates LTE-NR DC connected to EPC (EN-DC). Option 4 illustrates NR-LTE DC, connected to 5GCN (NE-DC). Option 5 illustrates LTE connected to 5GCN (eLTE or LTE-5GC). Option 7 illustrates LTE-NR DC, connected to 5GCN (NGEN-DC).

In principle, NR and LTE can be deployed without any interworking, which is referred to as NR stand-alone (SA) operation. The gNB in NR can be connected to a 5G core network (5GC) and the eNB can be connected to an EPC with no interconnection between the two (Option 1 and Option 2 in FIG. 1).

Another version of NR is the EN-DC (E-UTRAN-NR Dual Connectivity), illustrated by Option 3. In such a deployment, dual connectivity between NR and LTE is applied with LTE as the master and NR as the secondary node. The radio access node (RAN) node (gNB) supporting NR may not have a control plane connection to the core network (EPC), instead it relies on the LTE as master node (MeNB). This is referred to as "Non-standalone NR". In this case the functionality of an NR cell is limited and would be used for connected mode UEs as a booster and/or diversity leg, but an RRC_IDLE UE cannot camp on these NR cells.

With the introduction of 5GC, other options may be also valid. As mentioned above, Option 2 supports stand-alone NR deployment where the gNB is connected to the 5GC. Similarly, LTE can also be connected to the 5GC using Option 5 (also referred to as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). Option 4 and Option 7 are other variants of dual connectivity between LTE and NR which will be standardized as part of NG-RAN connected to 5GC, denoted by MR-DC (Multi-Radio Dual Connectivity). Options 6 and 8, where the gNB is connected to the EPC (with and without interconnectivity to LTE) are also possible, although they seem to be less practical and may not be pursued further in Third Generation Partnership Project (3GPP) discussions.

Because migration for the various options may differ from different operators, it is possible to have deployments with multiple options in parallel in the same network. For example, an eNB base station supporting Options 3, 5 and 7 may exist in the same network as a NR base station supporting Options 2 and 4.

The user plane (UP) and control plane (CP) protocol stacks in NR are illustrated in FIGS. 2 and 3, respectively. FIG. 2 illustrates protocols for user plane communication between the user equipment (UE) and the gNB, which include the service data adaptation protocol (SDAP), packet data convergence protocol (PDCP), radio link control (RLC), medium access control (MAC) and the physical (PHY) layer.

FIG. 3 illustrates protocols for control plane communication between the UE, gNB, and/or the access and mobility management function (AMF), which include the non-access stratum (NAS), radio resource control (RRC), PDCP, RLC, MAC and the PHY layer.

When reconfiguring the UE, the network transmits an RRCReconfiguration message containing a RadioBearerConfig and a CellGroupConfig information element. The RadioBearerConfig configures the PDCP and SDAP layers for all data radio bearers (DRBs) and the PDCP layer for all signaling radio bearers (SRBs). The CellGroupConfig configures the RLC, MAC, and PHY layer for all radio bearers (RBs).

For NR-DC, the RRCReconfiguration message may contain one or more RadioBearerConfig and one or more CellGroupConfig, namely radioBearerConfig and radioBearerConfig2 and masterCellGroup and secondaryCellGroup, respectively.

Each RadioBearerConfig contain a list of DRBs and/or SRBs that are terminated in the respective node, as well as a configuration for the security algorithms to be used.

The CellGroupConfig contains configurations for one or more cells associated to the respective node (master node (MN) or secondary node (SN)). One of the cells is denoted as a special cell, (PCell or PSCell), which is the primary cell used for communication. The other cells are secondary cells (SCells) that are monitored in case any of them can provide better radio conditions than the SpCell. The CellGroupConfig also contains a list of RLC bearers that are associated to a specific radio bearer with the parameter servedRadioBearer.

FIG. 4 is a block diagram illustrating radio bearers in dual connectivity. The block diagram includes network side protocol termination options for MCG, SCG and split bearers in MR-DC with 5GC (NGEN-DC, NE-DC and NR-DC).

As illustrated in FIG. 4, DRBs can be terminated in either the Master node or the Secondary node and can be transmitted via either the master cell group (MCG bearer), secondary cell group (SCG bearer) or both (split bearer). Any combination of MN and SN terminated bearers as well as MCG, SCG and split bearers can be configured for a UE.

For SRBs, SRB1 and SRB2 are terminated in the MN and can be either MCG, or split bearers, whereas SRB3 is terminated in the SN and can only be an SCG bearer. Although the concept illustrated in FIG. 4 shows the system connected to 5GC, the same principles apply to EN-DC connected to EPC.

When the UE is configured with two RadioBearerConfigs and two CellGroupConfigs, each RLC bearer in either CellGroupConfig can be associated to a radio bearer terminating in either the MN or the SN. For split bearers, an RLC bearer in masterCellGroup and an RLC bearer in secondaryCellGroup are configured with the same RB identity in the servedRadioBearer.

In combination with dual connectivity solutions between LTE and NR, each cell group (i.e., MCG and SCG) may also support carrier aggregation (CA) (i.e., MCG and SCG). One or more of the SCells in the CellGroupConfig is used to provide more radio resources to the UE. Initially, it was only DRBs that could be used in carrier aggregation, but in Rel-15, PDCP duplication was introduced, where the same data may be transmitted via two RLC bearers for both DRBs and SRBs to provide redundancies and increased reliability.

FIG. 5 is a state transition diagram illustrating the UE state machine and state transitions between NR/5GC, E-UTRA/EPC and E-UTRA/5GC. As illustrated, ongoing UE connections (UE is in RRC_CONNECTED) may be moved between the two RATs using a handover procedure. Additionally (not shown) the network may move the UE to the other RAT by sending a Release message with re-direct information. When the UE is in IDLE or INACTIVE state, the cell reselection procedure is used when transiting between the RATs.

In NR and E-UTRA (i.e., LTE connected to 5GC) a new RRC state called RRC_INACTIVE has been introduced. As used herein, NG-RAN refers to either NR or LTE connected to 5G Core (5GC) network.

In RRC_INACTIVE, the UE stores certain configurations, e.g., DRB configurations and physical layers parameters. When the UE needs to resume the connection, it transmits a RRCConnectionResumeRequest or RRCResumeRequest in LTE and NR respectively. The UE can then reuse the stored settings and reduce the time and signaling needed to enter RRC_CONNECTED.

In addition, in E-UTRA EPC, a suspended RRC connection state has been introduced, where the UE enters RRC_IDLE from RRC_CONNECTED, but it stores the configurations which can later be resumed.

Rel-15 (first release) of the NG-RAN standard may not support direct transition between RRC_INACTIVE in LTE/E-UTRA and RRC_INACTIVE in NR. Thus, a Rel-15 UE in RRC_INACTIVE in one RAT performing cell reselection to the other RAT triggers the UE to release its access stratum (AS) context, enter RRC_IDLE and perform a Registration Area Update.

In addition, if a UE is configured with MR-DC when entering RRC_INACTIVE, the UE will release the secondaryCellGroup configurations.

If the UE is connected to E-UTRA/EPC or E-UTRA/5GC either in single connectivity or in (NG)EN-DC when it is suspended to RRC_IDLE with suspended RRC Connection or RRC_INACTIVE respectively, when the UE initiates the RRC resume procedure, it will also release the MCG SCell(s).

In NR, an equivalent message exists for the case of long inactive radio network temporary identifier (I-RNTI) of 40 bits used as UE identifier RRCResumeRequest1, associated to a different logical channel compared to the short I-RNTI used in the RRCResumeRequest message.

Rel-16 includes enhancements to RRC resume procedure. In LTE/NR rel-16, the LTE RRCConnectionResume message (Inactive to Connected) can contain the MCG SCell configuration and the associated UE behavior in handling the SCell configuration is the same as in the Rel-15 RRC connection reconfiguration procedure. The UE maintains the MCG SCell configuration upon the initiation of the resume procedure. The RRC(Connection)Resume message contains an indication to restore/resume the MCG SCells (noting that behavior in legacy eNBs that do not support this feature needs to be considered). The (LTE and NR) RRC(Connection)Resume (Inactive to Connected))message can contain the SCG configuration and the associated UE behavior in handling the SCG configuration is the same as in the Rel-15 RRC (connection) reconfiguration procedure. The UE maintains the SCG configuration upon the initiation of the resume procedure. The RRC(Connection)Resume message contains an indication to restore/resume the SCG (noting that behavior in legacy e/gNBs that do not support this feature needs to be considered).

This means that the SCG can be restored, released or reconfigured during the resumption of an RRC connection. Specifically, when resuming from RRC_INACTIVE for EN-DC, NGEN-DC, NE-DC or NR-DC, SCG can be restored, released or reconfigured (either in a full or delta fashion). When resuming from suspended RRC_IDLE connection for EN-DC or NGEN-DC, SCG can be restored or released.

For synchronization and random access to the secondary node for dual connectivity in NR, the reconfigurationWithSync IE, which can be included for the PCell (in the CellGroupConfig of the MCG) or the PSCell (in the CellGroupConfig of the SCG), and as shown in the ASN.1 signaling below, contains the following IE: ServingCellConfigCommon, new UE-Identity, t304, rach-ConfigDedicated and smtc.

```
CellGroupConfig ::=            SEQUENCE {
    cellGroupId                    CellGroupId,
    rlc-BearerToAddModList         SEQUENCE (SIZE(1..maxLC-ID)) OF RLC-BearerConfig OPTIONAL,  --
Need N
    rlc-BearerToReleaseList        SEQUENCE (SIZE(1..maxLC-ID)) OF LogicalChannelIdentity OPTIONAL,
-- Need N
    mac-CellGroupConfig            MAC-CellGroupConfig            OPTIONAL,  -- Need M
    physicalCellGroupConfig        PhysicalCellGroupConfig        OPTIONAL,  -- Need M
    spCellConfig                   SpCellConfig                   OPTIONAL,  -- Need M
    sCellToAddModList              SEQUENCE (SIZE (1..maxNrofSCells)) OF SCellConfig
```

-continued

```
OPTIONAL,    -- Need N
    sCellToReleaseList              SEQUENCE (SIZE (1..maxNrofSCells)) OF SCellIndex
OPTIONAL,    -- Need N
    ...,
    [[
    reportUplinkTxDirectCurrent     ENUMERATED {true}           OPTIONAL   -- Cond BWP-Reconfig
    ]]
}
SpCellConfig ::=                    SEQUENCE {
    servCellIndex                   ServCellIndex               OPTIONAL,   -- Cond SCG
    reconfigurationWithSync         ReconfigurationWithSync     OPTIONAL,   -- Cond
ReconfWithSync
    rlf-TimersAndConstants          SetupRelease { RLF-TimersAndConstants } OPTIONAL,    --
Need M
    rlmInSyncOutOfSyncThreshold     ENUMERATED {n1}             OPTIONAL,   -- Need S
    spCellConfigDedicated           ServingCellConfig           OPTIONAL,   -- Need M
    ...
}
ReconfigurationWithSync ::=         SEQUENCE {
    spCellConfigCommon              ServingCellConfigCommon OPTIONAL,   -- Need M
    newUE-Identity                  RNTI-Value,
    t304                            ENUMERATED {ms50, ms100, ms150, ms200, ms500, ms1000,
ms2000, ms10000},
    rach-ConfigDedicated            CHOICE {
        uplink                          RACH-ConfigDedicated,
        supplementaryUplink             RACH-ConfigDedicated
    } OPTIONAL,    -- Need N
    ...,
    [[
    smtc                            SSB-MTC         OPTIONAL                -- Need S
    ]]
}
RACH-ConfigDedicated ::=            SEQUENCE {
    cfra                            CFRA                        OPTIONAL,   -- Need S
    ra-Prioritization               RA-Prioritization           OPTIONAL,   -- Need N
    ...
}
CFRA ::=                    SEQUENCE {
    occasions                       SEQUENCE {
        rach-ConfigGeneric              RACH-ConfigGeneric,
        ssb-perRACH-Occasion            ENUMERATED {oneEighth, oneFourth, oneHalf, one, two,
four, eight, sixteen}
OPTIONAL    -- Cond SSB-CFRA
    }
OPTIONAL,    -- Need S
    resources                       CHOICE {
        ssb                             SEQUENCE {
            ssb-ResourceList                SEQUENCE (SIZE(1..maxRA-SSB-Resources)) OF CFRA-
SSB-Resource,
            ra-ssb-OccasionMaskIndex        INTEGER (0..15)
        },
        csirs                           SEQUENCE {
            csirs-ResourceList              SEQUENCE (SIZE(1. .maxRA-CSIRS-Resources) ) OF CFRA-
CSIRS-Resource,
            rsrp-ThresholdCSI-RS            RSRP-Range
        }
    },
    ...,
    [[
    totalNumberOfRA-Preambles INTEGER (1..63)
OPTIONAL -- Cond Occasions
    ]]
}
CFRA-SSB-Resource ::=               SEQUENCE {
    ssb                             SSB-Index,
    ra-PreambleIndex                INTEGER (0..63),
    ...
}
CFRA-CSIRS-Resource ::=             SEQUENCE {
    csi-RS                          CSI-RS-Index,
    ra-OccasionList                 SEQUENCE (SIZE(1..maxRA-OccasionsPerCSIRS)) OF INTEGER
(0..maxRA-Occasions-1),
    ra-PreambleIndex                INTEGER (0..63),
    ...
}
```

The ServingCellConfigCommon is used to configure cell specific parameters of a UE's serving cell. The IE contains parameters that a UE typically acquires from SSB, MIB or SIBs when accessing the cell from IDLE. With this IE, the network provides the information in dedicated signaling when configuring a UE with SCells or with an additional cell group (SCG). Most of the parameters within the IE are also available in the ServingCellConfigCommonSIB IE, which is included in SIB1, and the UE uses the values that are broadcasted in SIB1 instead after it has read the SIB1.

The t304 specifies a guard timer that is used to ensure that the random access to the SpCell is completed on time (e.g., T304 is started when reconfigurationWithSync is received for the SCG, and if it expires before random access with the PSCell is successfully performed, the UE will trigger SCG failure information).

The rach-ConfigDedicated is used to specify the dedicated random access parameters the UE uses to perform random access during reconfiguration with sync (if it is not included, the UE will perform contention-based random access (CBRA) using the rach-ConfigCommon included in the servingCellConfigCommon).

Currently, the condition for the inclusion of the reconfigurationWithSync in the cellGroupConfig is mandatory present for SpCell change, PSCell addition, update of required SI for PSCell and AS security key change; otherwise it is optionally present. The field is absent in RRCResume or RRCSetup messages.

From the above conditional presence of the reconfigurationWithSync and the IEs it contains, and the way the IEs in the reconfigWithSync are used in the procedures, it is not clear whether the reconfigurationWithSync is part of the UE context or not. It could be interpreted that it is not part of the UE context because it is used only for synchronization and RA with the PSCell. On the other hand, the need conditions for it seem to imply that it is part of the UE context. Thus, It is not clear if the reconfigurationWithSync is part of the UE context.

However, in the RRC Release procedure, it is stated that the UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB. Thus, in NR the parameters received in reconfigurationWithSync or servingCellConfigCommonSIB are not part of the UE Inactive AS context.

For LTE, the IE equivalent to the reconfigurationWithSync for the SCG is the mobilityControlInfoSCG, which is shown below:

```
SCG-ConfigPartSCG-r12 ::=                SEQUENCE {
    radioResourceConfigDedicatedSCG-r12      RadioResourceConfigDedicatedSCG-r12      OPTIONAL,     --
Need ON
    sCellToReleaseListSCG-r12                SCellToReleaseList-r10                   OPTIONAL,     -- Need ON
    pSCellToAddMod-r12                       PSCellToAddMod-r12                       OPTIONAL,     -- Need ON
    sCellToAddModListSCG-r12                 SCellToAddModList-r10                    OPTIONAL,     -- Need ON
    mobilityControlInfoSCG-r12               MobilityControlInfoSCG-r12               OPTIONAL,     -- Need ON
    ...,
    [[
    sCellToReleaseListSCG-Ext-r13            SCellToReleaseListExt-r13                                OPTIONAL,     --
Need ON
    sCellToAddModListSCG-Ext-r13             SCellToAddModListExt-r13                                 OPTIONAL      --
Need ON
    ]] ,
    [[
    sCellToAddModListSCG-Ext-v1370           SCellToAddModListExt-v1370               OPTIONAL      -- Need ON
    ]],
    [[
    pSCellToAddMod-v1440                     PSCellToAddMod-v1440                     OPTIONAL      -- Need ON
    ]],
    [[ sCellGroupToReleaseListSCG-r15        SCellGroupToReleaseList-r15              OPTIONAL,     -- Need ON
       sCellGroupToAddModListSCG-r15         SCellGroupToAddModList-r15               OPTIONAL      -- Need ON
    ]],
    [[ -- NE-DC addition for setup/ modification and release SN configured measurements
       measConfigSN-r15                      MeasConfig                               OPTIONAL,                      -- Need ON
       -- NE-DC additions concerning DRBs/ SRBs are within RadioResourceConfigDedicatedSCG
       tdm-PatternConfigNE-DC-r15            TDM-PatternConfig-r15                    OPTIONAL                       -- Cond
FDD-PSCell
    ]],
    [[ p-MaxEUTRA-r15                        P-Max                                    OPTIONAL                       -- Need ON
    ]]
}
MobilityControlInfoSCG-r12               SEQUENCE {
    t307-r12                                 ENUMERATED {
                                                 ms50, ms 100, ms 150, ms200, ms500, ms1000,
                                                 ms2000, spare1},
    ue-IdentitySCG-r12                       C-RNTI                                   OPTIONAL,     -- Cond
SCGEst,
    rach-ConfigDedicated-r12                 RACH-ConfigDedicated                     OPTIONAL,     -- Need OP
    cipheringAlgorithmSCG-r12                CipheringAlgorithm-r12    OPTIONAL,          -- Need ON
    ...,
    [[ makeBeforeBreakSCG-rl4                ENUMERATED {true}                        OPTIONAL,     -- Need OR
       rach-SkipSCG-r14                      RACH-Skip-r14                            OPTIONAL      -- Need OR
    ]]
}
PSCellToAddMod-r12 ::=                   SEQUENCE {
    sCellIndex-r12                           SCellIndex-r10,
    cellIdentification-r12                   SEQUENCE {
```

```
    physCellId-r12              PhysCellId,
    dl-CarrierFreq-r12          ARFCN-ValueEUTRA-r9
  }                                                              OPTIONAL,            -- Cond
SCellAdd
  radioResourceConfigCommonPSCell-r12    RadioResourceConfigCommonPSCell-r12   OPTIONAL, --
Cond SCellAdd
  radioResourceConfigDedicatedPSCell-r12 RadioResourceConfigDedicatedPSCell-r12  OPTIONAL,
    -- Cond SCellAdd2
  ...,
  [[ antennaInfoDedicatedPSCell-v1280    AntennaInfoDedicated-v10i0            OPTIONAL  --
Need ON

[[ sCellIndex-r13              SCellIndex-r13   OPTIONAL        -- Need ON
  ]]
  [[ radioResourceConfigDedicatedPSCell-v1370  RadioResourceConfigDedicatedPSCell-v1370
  OPTIONAL  -- Need ON
  ]],
  [[ radioResourceConfigDedicatedPSCell-v13c0  RadioResourceConfigDedicatedPSCell-v13c0
  OPTIONAL  -- Need ON
  ]]
}
PSCellToAddMod-v12f0 ::=         SEQUENCE {
  radioResourceConfigCommonPSCell-r12    RadioResourceConfigCommonPSCell-v12f0           OPTIONAL
}
PSCellToAddMod-v1440             SEQUENCE {
  radioResourceConfigCommonPSCell-r14    RadioResourceConfigCommonPSCell-v144 0          OPTIONAL
}
RadioResourceConfigCommonPSCell-r12 =  SEQUENCE {
  basicFields-r12 ::=            RadioResourceConfigCommonSCell-r10,
  pucch-ConfigCommon-r12         PUCCH-ConfigCommon,
  rach-ConfigCommon-r12          RACH-ConfigCommon,
  uplinkPowerControlCommonPSCell-r12  UplinkPowerControlCommonPSCell-r12,
  ...,
  [[ uplinkPowerControlCommonPSCell-v1310
                                 UplinkPowerControlCommon-v1310   OPTIONAL          -- Need ON
  ]],
  [[ uplinkPowerControlCommonPSCell-v1530
                                 UplinkPowerControlCommon-v1530   OPTIONAL          -- Need ON
  ]]
}
```

One difference is that for LTE, the equivalent of the servingCellConfigCommon is not within the mobilityControlInfoSCG but within the pSCellToAddMod (inside the radioResourceConfigCommonPSCell). Similar to the NR case, it is also not clear by looking into the ASN.1 signaling and procedure codes if the concerned IEs that are relevant for restoring the EUTRA SCG without an SCG configuration (at least the mobilityControlInfoSCG and pSCellToAddMod) are part of the UE context.

Additionally, unlike the NR case, the specification describes what is to be done with these IEs when going to INACTIVE. The UE actions upon entering RRC_INACTIVE include storing in the UE Inactive AS Context, the current $K_{eNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured.

For synchronization and random access in LTE, whenever the UE performs a handover, it receives a RRCConnectionReconfiguration message that includes the mobilityControlInfo. (TS 36.331 v15.7.0). This contains all the configurations the UE requires to access the target cell and will trigger the UE to perform a random access to it (e.g., to obtain synchronization with the cell).

If the RRCConnectionReconfiguration message includes the mobilityControlInfo and the UE is able to comply with the configuration included in the message, the UE starts synchronising to the downlink of the target PCell and reset MCG MAC and SCG MAC, if configured.

For handover, the MAC, upon getting the RRCConnectionReconfigurationComplete message and noticing that it is the first time that it is sending data on this link, will initiate the random access procedure.

In case of LTE DC, the secondary radio configuration can contain a field called mobilityControlInfoSCG, during SCG change or addition, that has a similar functionality as the mobilityControlInfo field in the RRCConnectionReconfiguration, but for the secondary cell group. The relevant IEs are shown below from 36.331:

```
SCG-ConfigPartSCG-r12 ::=         SEQUENCE {
  radioResourceConfigDedicatedSCG-r12   RadioResourceConfigDedicatedSCG-r12   OPTIONAL,    --
Need ON
  sCellToReleaseListSCG-r12             SCellToReleaseList-r10                OPTIONAL,    -- Need ON
  pSCellToAddMod-r12                    PSCellToAddMod-r12                    OPTIONAL,    -- Need ON
  sCellToAddModListSCG-r12              SCellToAddModList-r10                 OPTIONAL,    -- Need ON
  mobilityControlInfoSCG-r12            MobilityControlInfoSCG-r12            OPTIONAL,    -- Need ON
  ...,
```

-continued

```
    [[
    sCellToReleaseListSCG-Ext-r13        SCellToReleaseListExt-r13             OPTIONAL,   --
Need ON
    sCellToAddModListSCG-Ext-r13         SCellToAddModListExt-r13              OPTIONAL    --
Need ON
    ]],
    [[
    sCellToAddModListSCG-Ext-v1370       SCellToAddModListExt-v1370            OPTIONAL    -- Need ON
    ]],
    [[
    pSCellToAddMod-v1440                 PSCellToAddMod-v1440                  OPTIONAL    -- Need ON
    ]],
    [[  sCellGroupToReleaseListSCG-r15   SCellGroupToReleaseList-r15           OPTIONAL,   -- Need ON
        sCellGroupToAddModListSCG-r15    SCellGroupToAddModList-r15            OPTIONAL    -- Need ON
    ]],
    [[ -- NE-DC addition for setup/ modification and release SN configured measurements
        measConfigSN-rl5                 MeasConfig                            OPTIONAL,   -- Need ON
        -- NE-DC additions concerning DRBs/ SRBs are within RadioResourceConfigDedicatedSCG
        tdm-PatternConfigNE-DC-rl5       TDM-PatternConfig-r15                 OPTIONAL    -- Cond
FDD-PSCell
    ]],
    [[ p-MaxEUTRA-r 15                   P-Max                                 OPTIONAL    -- Need ON
    ]]
}
MobilityControlInfoSCG-r12 ::=           SEQUENCE {
    t307-r12                                 ENUMERATED {
                                                 ms50, ms100, ms150, ms200, ms500, ms1000,
                                                 ms2000, spare1},
    ue-IdentitySCG-r12                       C-RNTI                            OPTIONAL,   -- Cond
SCGEst,
    rach-ConfigDedicated-r12                 RACH-ConfigDedicated              OPTIONAL,   -- Need OP
    cipheringAlgorithmSCG-r12                CipheringAlgorithm-r12   OPTIONAL,   -- Need ON
    ...,
    [[ makeBeforeBreakSCG-r14                ENUMERATED {true}                 OPTIONAL,   -- Need OR
       rach-SkipSCG-r14                      RACH-Skip-r14                     OPTIONAL    -- Need OR
    ]]
}
PSCellToAddMod-r12 ::=                   SEQUENCE {
    sCellIndex-r12                           SCellIndex-r10,
    cellIdentification-r12                   SEQUENCE {
        physCellId-r12                           PhysCellId,
        dl-CarrierFreq-r12                       ARFCN-ValueEUTRA-r9
    }                                                                          OPTIONAL,   -- Cond
SCellAdd
    radioResourceConfigCommonPSCell-r12      RadioResourceConfigCommonPSCell-r12 OPTIONAL,  --
Cond SCellAdd
    radioResourceConfigDedicatedPSCell-r12   RadioResourceConfigDedicatedPSCell-r12         OPTIONAL,
    -- Cond SCellAdd2
    ...,
    [[ antennaInfoDedicatedPSCell-v1280       AntennaInfoDedicated-v10i0       OPTIONAL    --
Need ON
    ]],
    [[ sCellIndex-r13                        SCellIndex-r13   OPTIONAL          -- Need ON
    ]],
[[ radioResourceConfigDedicatedPSCell-v1370  RadioResourceConfigDedicatedPSCell-v1370
    OPTIONAL   -- Need ON
    ]],
    [[ radioResourceConfigDedicatedPSCell-v13c0   RadioResourceConfigDedicatedPSCell-v13c0
    OPTIONAL   -- Need ON
    ]]
}
PSCellToAddMod-v12f0 ::=                 SEQUENCE {
    radioResourceConfigCommonPSCell-r12      RadioResourceConfigCommonPSCell-v12f0          OPTIONAL
}
PSCellToAddMod-v1440 ::=                 SEQUENCE {
    radioResourceConfigCommonPSCell-r14      RadioResourceConfigCommonPSCell-v1440          OPTIONAL
}
RadioResourceConfigCommonPSCell-r12 ::=  SEQUENCE {
    basicFields-r12                          RadioResourceConfigCommonSCell-r10,
    pucch-ConfigCommon-r12                   PUCCH-ConfigCommon,
    rach-ConfigCommon-r12                    RACH-ConfigCommon,
    uplinkPowerControlCommonPSCell-r12       UplinkPowerControlCommonPSCell-r12,
    ...,
    [[ uplinkPowerControlCommonPSCell-v1310
                                             UplinkPowerControlCommon-v1310    OPTIONAL    -- Need ON
    ]],
```

```
[[ uplinkPowerControlCommonPSCell-v1530
                                    UplinkPowerControlCommon-v1530    OPTIONAL    -- Need ON
    ]]
}
```

Because the UE does not transmit an RRCConnectionReconfigurationComplete directly to the SCG, as this message is only sent to the MCG, the procedures explicitly trigger a random access procedure for the SCG when the UE receives the mobilityControlInfoSCG.

3GPP specifies that for SCG reconfiguration, the UE shall, if scg-Configuration is received and is set to release or includes the mobilityControlInfoSCG (i.e. SCG release/change) and if scg-ConfigPartSCG is received and includes the mobilityControlInfoSCG (i.e., SCG change), then: start timer T307 with the timer value set to t307, as included in the mobilityControlInfoSCG, if makeBeforeBreakSCG is not configured; start synchronising to the downlink of the target PSCell; and initiate the random access procedure on the PSCell, as specified in TS 36.321, if rach-SkipSCG is not configured.

For NE-DC, the same procedure (RRC connection reconfiguration, which further calls SCG reconfiguration) will be triggered for the SCG because an LTE RRC connection reconfiguration message (containing the E-UTRA SCG configuration) is embedded in the NR RRCReconfiguration message.

For NR, the cell group configuration, which can be either for the MCG or SCG, can contain the reconfigurationWithSync field that provides a similar functionality to the mobilityControlInfo and mobilityControlInfoSCG in LTE (TS 38.331).

3GPP specifies that a UE shall perform the following actions to execute a reconfiguration with sync. If the AS security is not activated, perform the actions upon going to RRC_IDLE as specified in 5.3.11 with the release cause 'other' upon which the procedure ends. Stop timer T310 for the corresponding SpCell, if running. Start timer T304 for the corresponding SpCell with the timer value set to t304, as included in the reconfigurationWithSync.

If the frequencyInfoDL is included, then consider the target SpCell to be one on the SSB frequency indicated by the frequencyInfoDL with a physical cell identity indicated by the physCellId. Otherwise, consider the target SpCell to be one on the SSB frequency of the source SpCell with a physical cell identity indicated by the physCellId.

The UE shall start synchronising to the downlink of the target SpCell, apply the specified broadcast control channel (BCCH) configuration defined in 9.1.1.1, and acquire the MIB, which is scheduled as specified in TS 38.213;

The UE should perform the reconfiguration with sync as soon as possible following the reception of the RRC message triggering the reconfiguration with sync, which could be before confirming successful reception (HARQ and ARQ) of this message. The UE may omit reading the MIB if the UE already has the required timing information, or the timing information is not needed for random access.

The UE shall reset the MAC entity of this cell group and consider the SCell(s) of this cell group, if configured, to be in deactivated state. The UE shall apply the value of the new UE-Identity as the C-RNTI for this cell group, configure lower layers in accordance with the received spCellConfigCommon, and configure lower layers in accordance with any additional fields, not covered in the previous, if included in the received reconfigurationWithSync.

For reception of an RRCReconfiguration by the UE, The UE shall perform the following actions upon reception of the RRCReconfiguration. If the RRCReconfiguration includes the secondaryCellGroup, then perform the cell group configuration for the SCG according to 5.3.5.5. (This calls the cell group configuration, that will call the reconfiguration with sync procedure, if the reconfiguration with sync was included in the cell group.)

If the RRCReconfiguration includes the mrdc-SecondaryCellGroupConfig, and if the mrdc-SecondaryCellGroupConfig is set to setup, then if the mrdc-SecondaryCellGroupConfig includes mrdc-ReleaseAndAdd, perform MR-DC release as specified in section 5.3.5.10. Otherwise, if the received mrdc-SecondaryCellGroup is set to nr-SCG, perform the RRC reconfiguration according to 5.3.5.3 for the RRCReconfiguration message included in nr-SCG. If the received mrdc-SecondaryCellGroup is set to eutra-SCG, then perform the RRC connection reconfiguration as specified in TS 36.331, clause 5.3.5.3 for the RRCConnectionReconfiguration message included in eutra-SCG.

If the mrdc-SecondaryCellGroupConfig is set to release, then perform MR-DC release as specified in section 5.3.5.10.

If the UE is configured with E-UTRA nr-SecondaryCellGroupConfig (MCG is E-UTRA, i.e. EN-DC case) and if RRCReconfiguration was received via SRB1, then submit the RRCReconfigurationComplete via the E-UTRA MCG embedded in E-UTRA RRC message RRCConnectionReconfigurationComplete as specified in TS 36.331. If reconfigurationWithSync was included in spCellConfig of an SCG, then initiate the random access procedure on the SpCell, as specified in TS 38.321.

The order the UE sends the RRCConnectionReconfigurationComplete message and performs the Random Access procedure towards the SCG is left to UE implementation.

If RRCReconfiguration was received via SRB3, then submit the RRCReconfigurationComplete message via SRB3 to lower layers for transmission using the new configuration.

In (NG)EN-DC and NR-DC, in the case RRCReconfiguration is received via SRB1, the random access is triggered by RRC layer itself as there is not necessarily other UL transmission. In the case RRCReconfiguration is received via SRB3, the random access is triggered by the MAC layer due to arrival of RRCReconfigurationComplete.

If RRCReconfiguration message was received within the nr-SCG within mrdc-SecondaryCellGroup (NR SCG RRC Reconfiguration, i.e. NR-DC case) and if reconfigurationWithSync was included in spCellConfig in nr-SCG, then initiate the random access procedure on the PSCell, as specified in TS 38.321.

For (NG)EN-DC, the same procedures (RRC, which further calls the reconfiguration with sync for the secondary cell group) will be triggered for the SCG because an NR RRC reconfiguration message (containing the NR SCG configuration) is embedded in the LTE RRCConnectionReconfiguration message.

There currently exist certain challenges. For example, as described above, the UE does not keep the parameters received with ReconfigurationWIthSync or servingCellConfigCommonSIB in NR and it is not clear which of the parameters related to the SCG are kept in the UE context when the UE is in INACTIVE or IDLE with suspended state in LTE. This means it will not be possible to restore the SCG in resume (e.g., UE is not able to perform random access or have a C-RNTI for the SCG) without containing the SCG configuration including at least:

NR-DC: the reconfigurationWithSync for the PSCell in the nr-SCG field of the RRCResume;

(NG)EN-DC: the reconfigurationWIthSync for the PSCell in nr-SecondaryCellGroupConfig field of the RRCConnectionResume;

NE-DC: the scg-Configuration that contains the mobiltiyControlInfoSCG and the pSCellToAddMod-r12 in the eutra-SCG of the RRCResume.

However, mandating this goes against one of the benefits for enabling SCG resume (i.e., signaling reduction). Thus, mandating the inclusion of reconfigurationWithSync (when the SCG is NR) for the PSCell or the mobilityControlInfo and pSCellToAddMod (when the SCG is EUTRA) in the resume message, even in the case where the stored SCG is to be restored as is, will decrease the signaling benefit of direct resumption with SCG.

In the case of EN-DC, when the UE in LTE is resuming from a suspended connection (i.e., IDLE with suspended state), the RRCConnectionResume message is not encrypted and thus the nr-SecondaryCellGroupConfig field cannot be included. Thus, if the reconfigurationWithSync for the PSCell in nr-SecondaryCellGroupConfig needs to be included in the RRCConnectionResume message to resume the SCG, it is not possible to resume with EN-DC and an additional RRCConnectionReconfiguration message is required to setup EN-DC, which increases the latency to configure the UE with DC (which is one of the reasons to support SCG resume in the first place). Thus, mandating the inclusion of reconfigurationWithSync for the PSCell will make it impossible to support the resumption of the stored SCG in EN-DC, as the RRCConnectionResume message is not encrypted and radio resource configuration, except for basic configuration to resume the SRB1 cannot be included in non-encrypted messages.

If the SCG is to be restored as is during connection resumption, there is no need to include the SCG configuration. As such, the UE will not receive any mobilityControlInfoSCG or reconfigurationWithSync associated with the SCG. However, with the current specified UE behavior, the UE will not be able to perform synchronization and the required random access towards the PSCell, which is required before the UE can start sending/receiving data to/from the SCG.

SUMMARY

Based on the description above, certain challenges currently exist with synchronization and random access during connection resume. Certain aspects of the present disclosure and their embodiments may provide solutions to these or other challenges.

Particular embodiments facilitate resumption of the stored secondary cell group (SCG) without the need to provide any SCG configuration. This is enabled by: storing parameters that are related to synchronization and random access of the PSCell while the user equipment (UE) is in CONNECTED state; storing the parameters in the UE Inactive AS context when the UE is ordered to transit to a DORMANT state (i.e., IDLE with suspended or INACTIVE state). On receiving a message to resume the connection: determining that no SCG configuration is provided but the resuming of the SCG with the stored SCG is requested, and retrieving the parameters required to perform the synchronization and random access to the PSCell from the stored Inactive UE access stratum (AS) context. Some embodiments use these parameters to perform the synchronization and random access to the PSCell. Once random access is successfully completed, particular embodiments resume the data communication with the SCG.

According to some embodiments, a method performed by a wireless device capable of operating in dual connectivity with a first network node in a master cell group (MCG) and a second network node in a SCG comprises receiving a connection configuration message from the first network node. The connection configuration message includes parameters for setup or modification of the SCG. The method further comprises storing one or more parameters related to synchronization or random access with the second network node, operating in dual connectivity with the first network node and the second network node according to the received connection configuration, storing configuration information about the second network node received via system information, and receiving a connection release message from the first network node. The connection release message instructs the wireless device to transition to an idle/inactive state. The method further comprises receiving a connection resume message from the first network node. The connection resume message indicates to resume dual connectivity operation with the SCG. The method further comprises determining the connection resume message does not include a new or modified configuration for the SCG and performing synchronization and random access with the second network node using the stored parameters.

In particular embodiments, when the second network node is operating in new radio (NR), the connection configuration message includes a reconfigurationWithSync information element for the SCG, and when the second network node is operating in long term evolution (LTE), the connection configuration message includes a mobilityControlInfoSCG and a PSCellToAddMod information element for the SCG.

In particular embodiments, storing one or more parameters related to synchronization or random access with the second network node comprises storing one or more of a random access guard time for the SCG, a wireless device identity used with the SCG, and a dedicated random access configuration for the SCG.

In particular embodiments, storing configuration information about the second network node received via system information comprises, when the second network node is operating in NR, storing servingCellConfigCommon information element from system information block 1 (SIB1), and when the second network node is operating in long term evolution (LTE), storing radioResourceConfigCommon information element from system information block 2 (SIB2).

In particular embodiments, transitioning to the idle/inactive state comprises saving the stored parameters in a wireless device inactive context.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a first network node comprises transmitting a configuration message to a wireless device. The configuration message includes configuration information for dual connectivity operation with a SCG and an indication of one or more configuration parameters for the SCG that the wireless device should store for later use. The method further comprises transmitting an indication to the wireless device to transition to an idle/inactive state and transmitting an indication to the wireless device to resume a connection with the SCG.

In particular embodiments, the indication to transition to an idle/inactive state includes an indication of one or more configuration parameters for the SCG that the wireless device should store in a wireless device inactive context.

In particular embodiments, the indication to transition to resume a connection includes an indication of one or more configuration parameters for the SCG that the wireless device should retrieve from a wireless device inactive context.

In particular embodiments, the method further comprises transmitting an indication to a second network node to resume the SCG and receiving an indication from the second network node whether the SCG can be resumed without a modified configuration.

According to some embodiments, a method performed by a second network node comprises receiving an indication from a first network node to resume a SCG for a wireless device, determining that the SCG can be resumed without a modified configuration, and transmitting an indication to the first network node that the SCG can be resumed without a modified configuration.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, without particular embodiments, it is not possible to properly resume the stored SCG because the UE will not get an indication (i.e., a mobilityControlInfoSCG if the SCG was E-UTRA or a reconfigurationWithSync if the SCG was NR), that is what is currently used in LTE/NR to trigger the synchronization and the random-access procedure towards the PSCell. Without particular embodiments, it is not possible to perform SCG resume in EN-DC.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
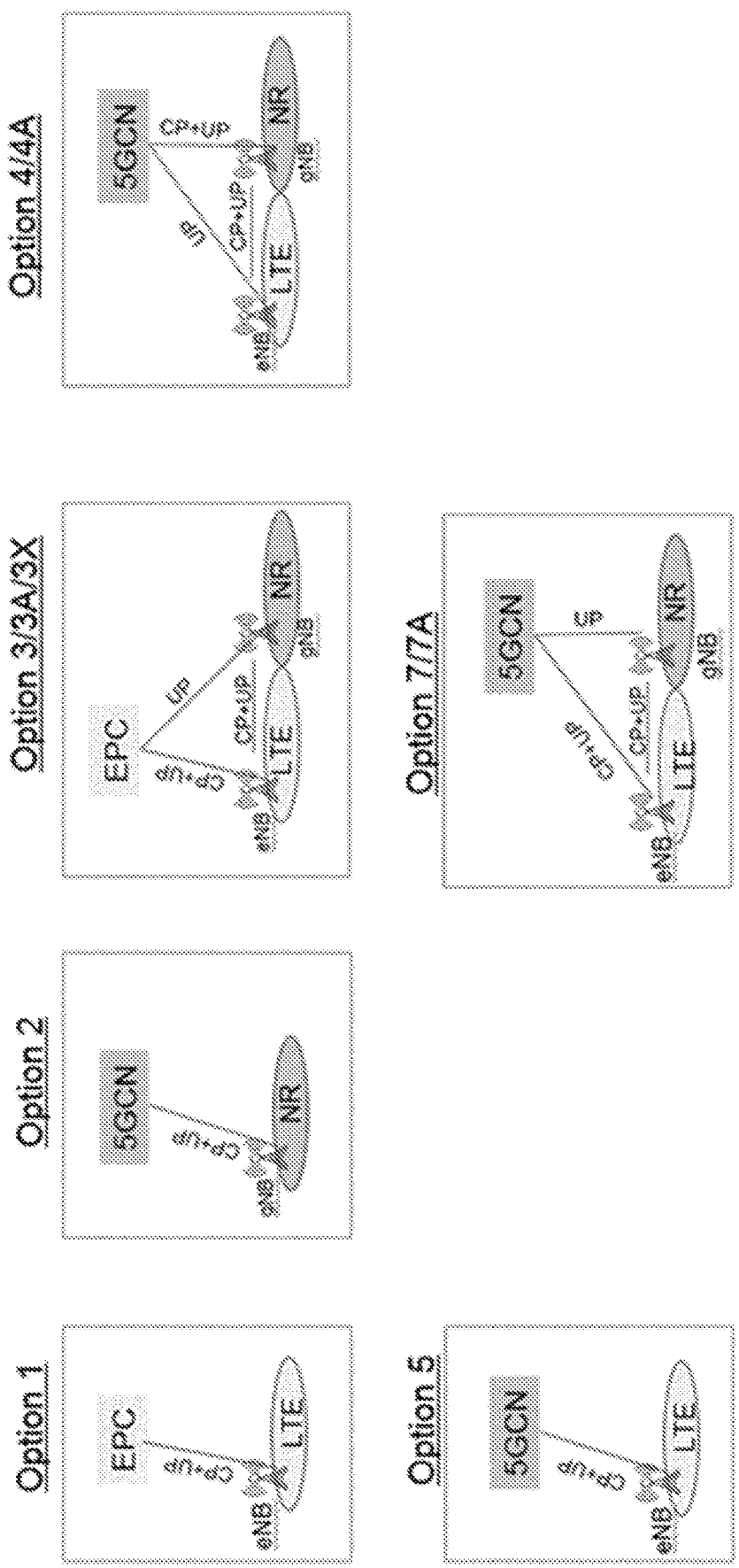
FIG. 1 illustrates six example network deployments for fifth generation (5G) and long term evolution (LTE) interworking.
Figure 2:
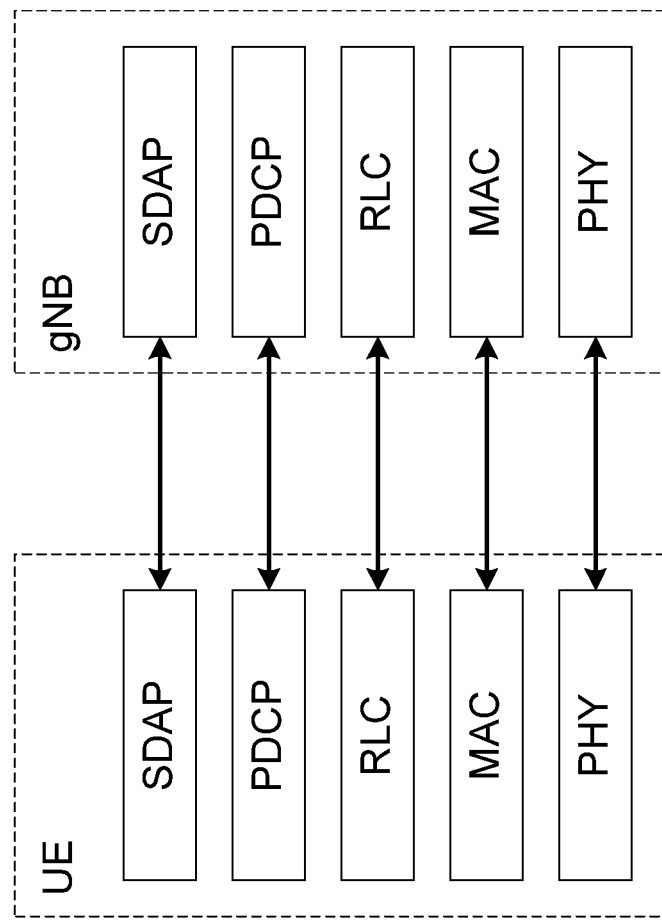
FIG. 2 is a block diagram illustrating the user plane (UP) protocol stack.
Figure 3:
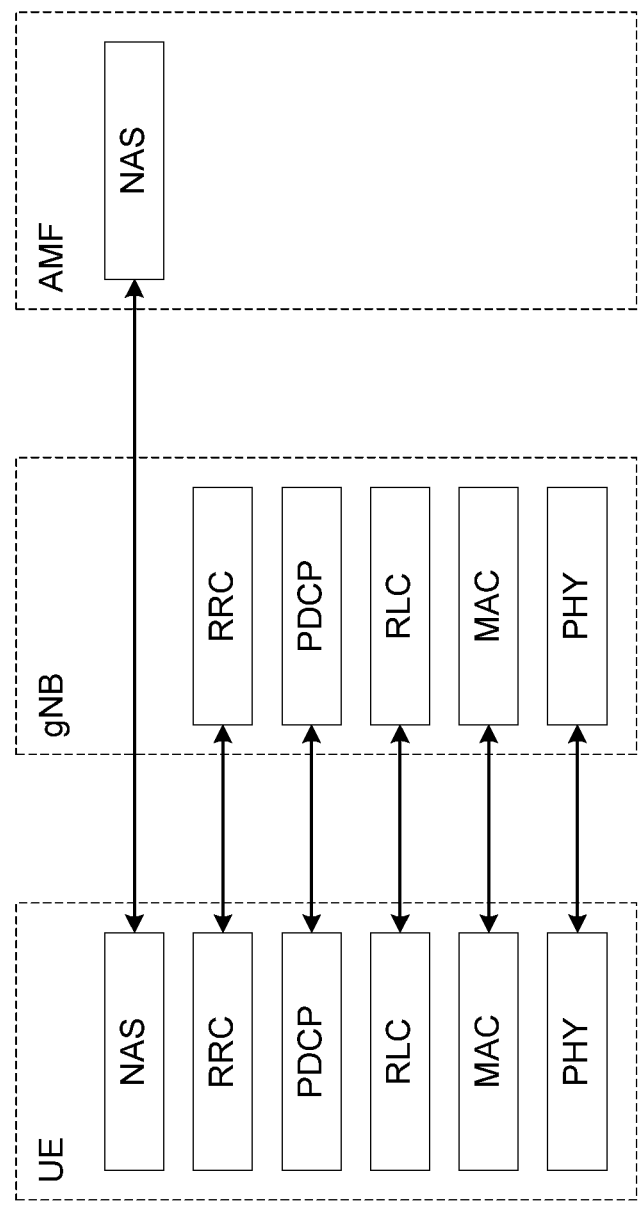
FIG. 3 is a block diagram illustrating the control plane (CP) protocol stack.
Figure 4:
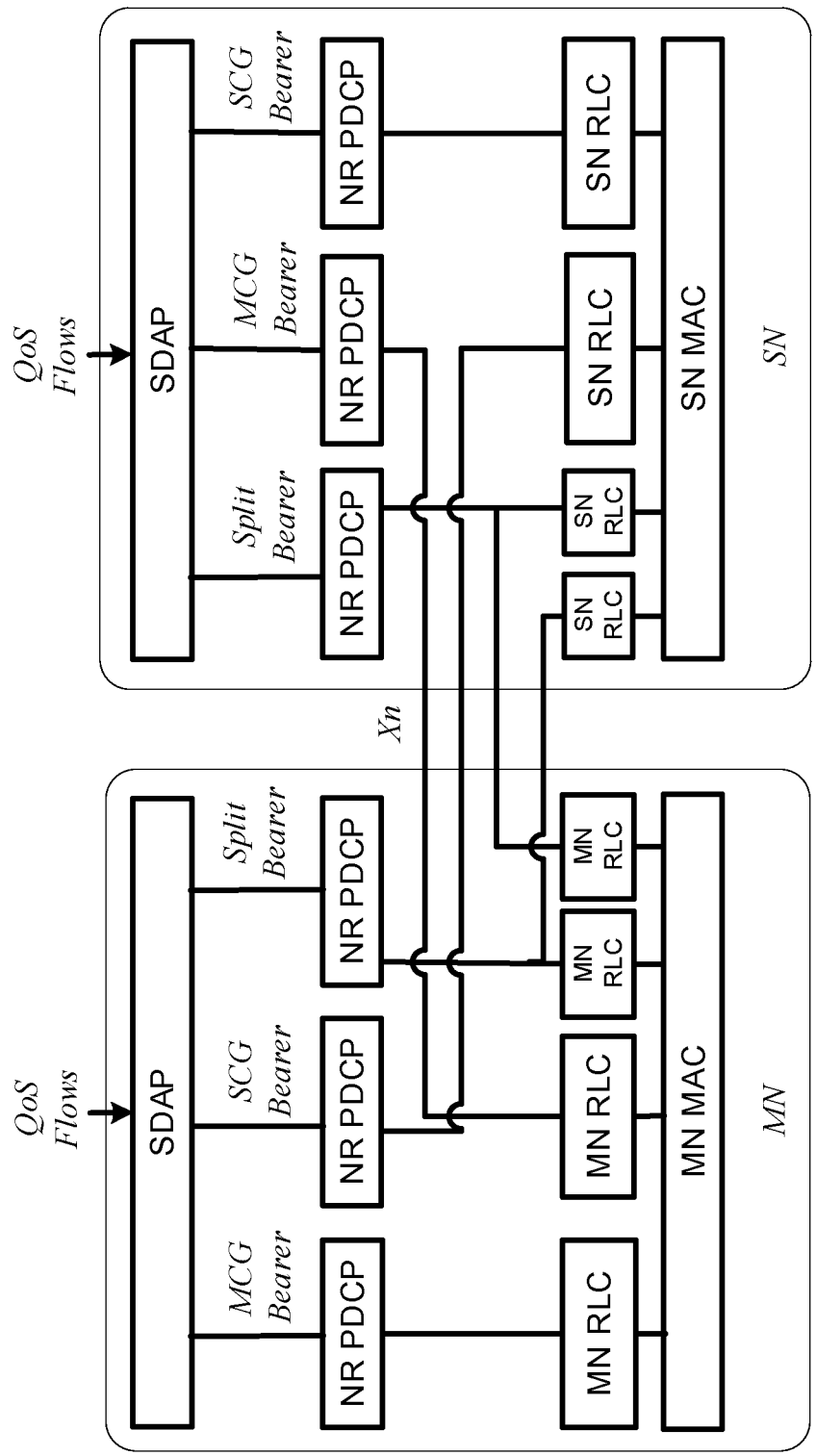
FIG. 4 is a block diagram illustrating radio bearers in dual connectivity.
Figure 5:
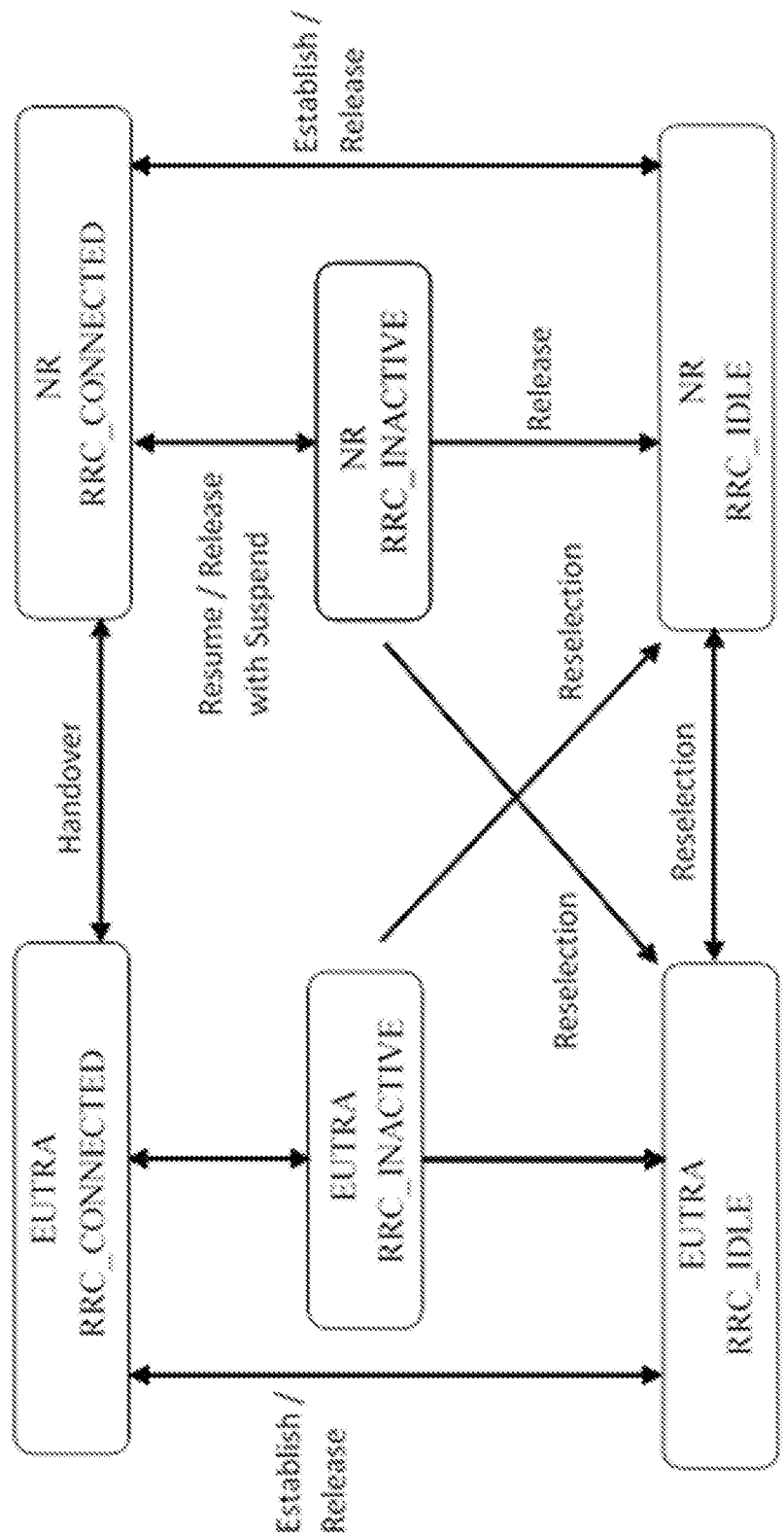
FIG. 5 is a state transition diagram illustrating the UE state machine and state transitions between NR/5GC, E-UTRA/EPC and E-UTRA/5GC.

As described above, certain challenges currently exist with synchronization and random access during connection resume when operating in dual connectivity. Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Although the examples described herein refer to dual connectivity between evolved universal terrestrial radio access (E-UTRA) and new radio (NR) (e.g., EN-DC, NGEN-DC, NE-DC) or between two NR nodes (NR-DC), the embodiments are equally applicable in long term evolution (LTE) DC (i.e., two E-UTRA nodes connected to evolved packet core (EPC) as specified in E-UTRA Rel-13) or between two E-UTRA nodes connected to fifth generation core (5GC) (currently not supported). Furthermore, if later releases support the UE to connect to more than two nodes, the same embodiments apply to resuming these additional connections.

Some embodiments include a user equipment (UE). Particular embodiments include a method at a wireless terminal/UE that is capable operating in dual connectivity with a master cell group (MCG) with a first node, the master node (MN), and a secondary cell group (SCG) with a second node, the secondary node (SN). The method comprises receiving from a first node a connection configuration message that includes the setup or modification of a secondary cell group. The connection configuration message may include at least one of an SCG configuration containing a reconfigurationWithSync IE, if the secondary node is employing NR (e.g., within secondaryCellGroupConfig of IE CellGroupConfig) and an SCG configuration containing a mobilityControlInfoSCG and pSCellToAdc/ModIE, if the secondary node is employing LTE.

The method further comprises storing one or more of the parameters related to synchronization or random access with the primary cell of the SCG (PSCell). The parameters may include the following. For a secondary node operating in NR, the parameters include t304 for the SCG (random access (RA) guard time for the SCG), new UE-Identity (cell radio network temporary identifier (C-RNTI) used by the PSCell), and rach-ConfigDedicated (for the PSCell). For a secondary node is operating in LTE, the parameters include t307 (RA guard time for the SCG), ue-IdentitySCG (C-RNTI used by the PSCell), and rach-ConfigDedicated (for the PSCell).

In particular embodiments, storing may be done upon reception of the parameters. In some embodiments, a parameter may correspond to a field of an associated Information Element (IE), (as defined in TS 38.331) and fields within that IE.

The method further comprises applying the received configuration and operating in dual connectivity (DC) mode with the first node and second node and storing other common parameters related to the PSCell from system information: For example, when the secondary node is operating in NR, storing the servingCellConfigCommon from SIB1. When the secondary node is operating in LTE, storing the radioResourceConfigCommon from SIB2.

The method may include the optional step of receiving from a first node, in the connection configuration message, an indication if the above parameters related to the PSCell are to be stored/saved by the UE. The indication may be one indicator specifying whether all the parameters should be stored or not, may be an indicator for each parameter or a group of parameters (e.g., a separate indicator to save the dedicated random access channel (RACH) configuration or not), may include need codes to indicate to the UE whether a parameter is to be stored upon its reception.

The method further comprises receiving from the first node a connection release message instructing the UE to transition to a dormant state (IDLE with suspended or INACTIVE state) and storing the parameters related to the synchronization and random access to the PSCell and the other parameters related to the PSCell in the UE inactive AS context. The UE then transitions to the dormant state.

The method may include an optional step of receiving from the first node, in the connection release message, an indication which of the above stored parameters related to the PSCell are to be stored/saved in the UE Inactive AS context and/or discarded. The indication may be one indicator specifying whether all the parameters should be stored in the UE Inactive AS context or not, or there may be an indicator for each parameter or a group of parameters (e.g., a separate indicator to save the dedicated RACH configuration in the UE inactive context or not).

The method further comprises receiving from a first node a connection resume message with an indication to resume the stored SCG. Upon detecting that no new or delta configuration of the SCG is provided in the received connection resume message, the method includes restoring/retrieving the stored SCG configuration, including the parameters related to the synchronization and random access to the PSCell and the other parameters related to the PSCell from the stored UE Inactive AS context. The UE starts synchronization and random access with the stored PSCell using these configurations:

For example, the UE may start the RA guard timer T304 with the value of the retrieved t304 (when the SCG is NR) or guard timer T307 with the value of the retrieved t307 (when the SCG is LTE), and if the RA with the PSCell is not finalized before that timer expires, initiate the SCG failure procedure.

If a dedicated RACH configuration was not stored, the UE may apply a contention based random access procedure (using the information available in retrieved servingCellConfigCommon if the SCG is NR or radioResourceConfigCommon if the SCG is LTE).

The method may include the optional step of receiving from the first node, in the connection resume message, an indication which of the stored parameters in the UE Inactive AS context related to the PSCell are to be restored and used for the synchronization and random access towards the PSCell. The indication may be one indicator specifying whether all the parameters from the UE Inactive AS context should be restored or not, or the indication may include an indicator for each parameter or a group of parameters (e.g., a separate indicator to restore the dedicated RACH configuration from the UE inactive context or not).

Some embodiments include a network node. Particular embodiments include methods at a network node (LTE eNB or NR gNB). The method comprises sending a configuration to the UE concerning the SCG configuration, where the configuration contains parameters related to performing synchronization and random access with the PSCell. The configuration message may optionally indicate which parameters should be stored in the UE for reuse at a later point after the configuration is applied. The indication may be one indication related to all the parameters or a separate indication for each parameter.

The indication to store the parameters may be included in an RRC reconfiguration like message (e.g., RRCConnectionReconfiguration, RRCReconfiguration) or included in broadcast signaling (e.g., SIB).

The method further comprises sending a message to a UE ordering it to transition to a dormant state in an RRC Release like message (e.g., RRCConnectionRelease, RRCRelease). The message may optionally indicate which parameters related to the SCG (e.g., parameters related to synchronization and random access to the PSCell) should be stored in the UE Inactive AS context. The indication may be one indication related to all the parameters or a separate indication for each parameter or group of parameters.

When the network node determines to resume the dormant UE's RRC connection, the method further comprises sending an indication to a second network node to resume the suspended SCG, receiving an indication from the second node whether the stored SCG can be resumed as is or with a new updated SCG configuration, and sending a message to a UE ordering it to resume a dormant connection in an RRC Resume like message (e.g., RRCConnectionResume, RRCResume). The message may optionally indicate which parameters related to the SCG (e.g., parameters related to synchronization and random access to the PSCell) should be retrieved from the UE Inactive AS context and used in resuming the connection. The indication may be one indication related to all the parameters or a separate indication for each parameter or group of parameters.

Particular embodiments include methods at a second network node (LTE eNB or NR gNB). The method comprises receiving from a first network node an indication to resume the SCG for a UE which is suspended, which was previously operating in dual connectivity with a master cell in a first node and a secondary cell in the second network node.

The method further comprises indicating to the first node, either implicitly or explicitly, whether the parameters related to the PSCell that are part of the UE context are still valid. The indication may be one indicator specifying whether all the parameters could be reused by the UE or not, may be an indicator for each parameters or a group of parameters (e.g., a separate indicator to indicate the dedicated RACH configuration could be reused or not), or the indicator may be an implicit one, where the secondary node provides an SCG configuration that the UE has to apply, either in a delta or full configuration manner, to the first node.

The method further comprises receiving a random access request from the UE and sending a random access response to the UE and resume the connection with the UE.

Figure 6:
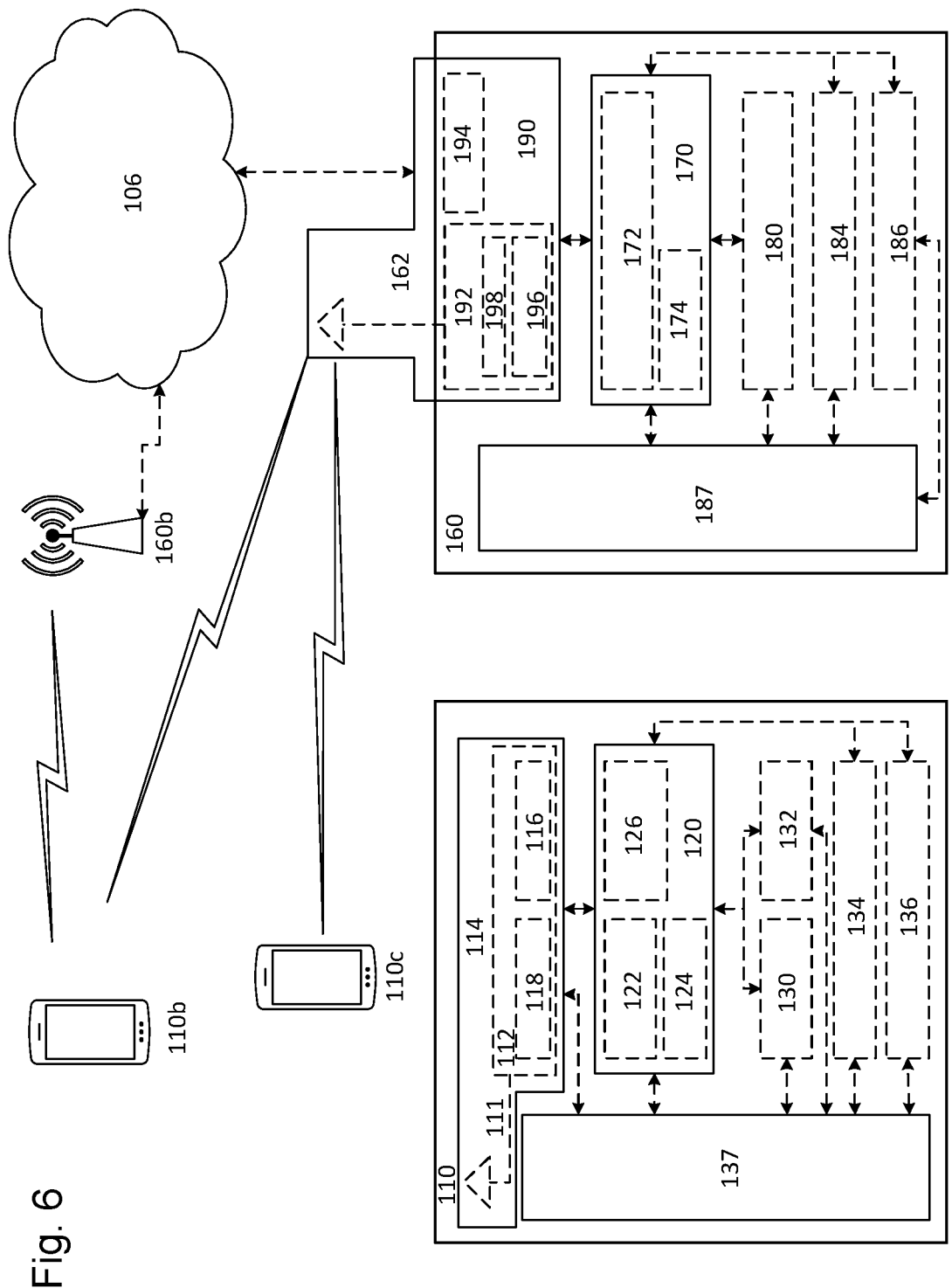
FIG. 6 is a block diagram illustrating an example wireless network.

FIG. 6 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components. In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 7:
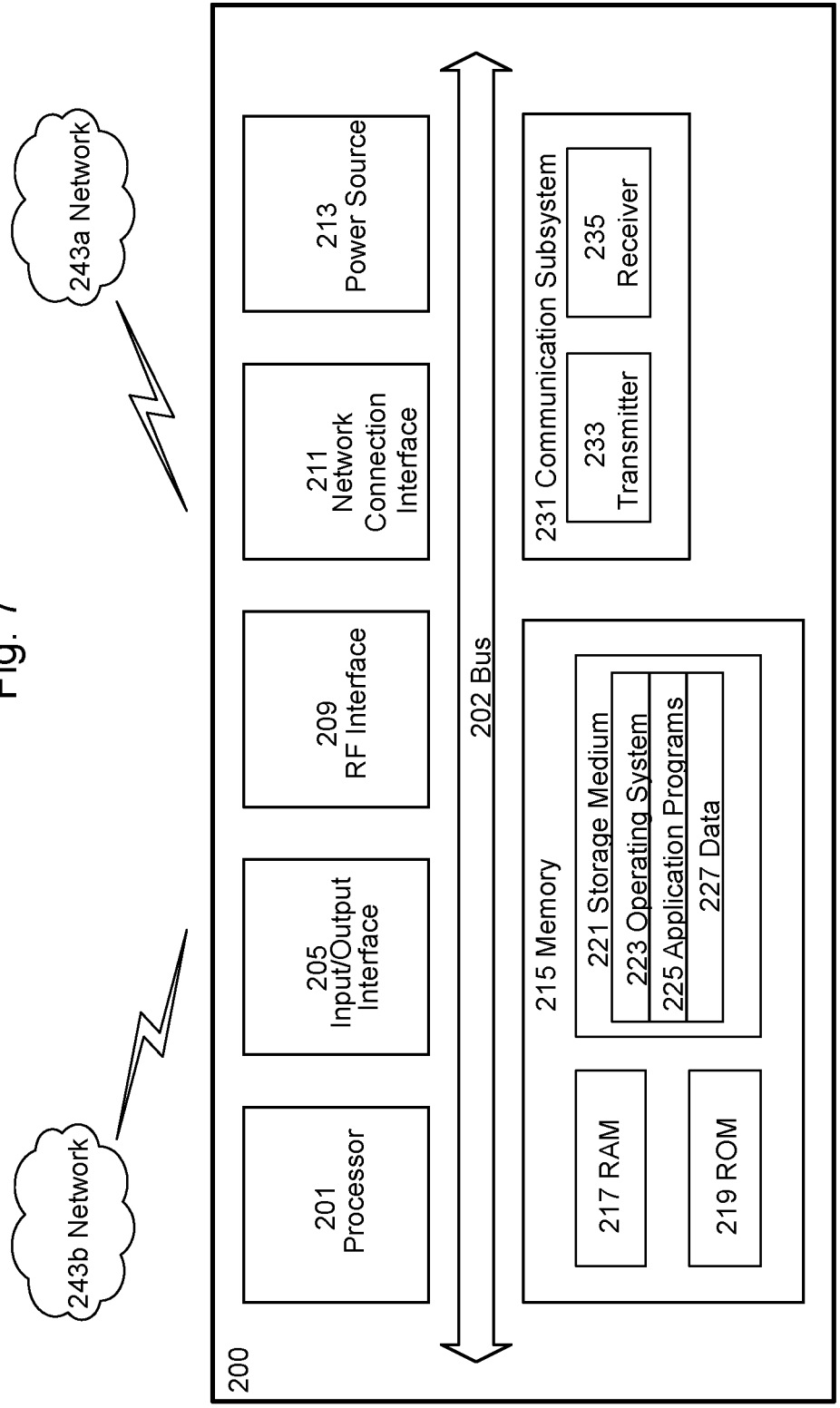
FIG. 7 illustrates an example user equipment, according to certain embodiments.

FIG. 7 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
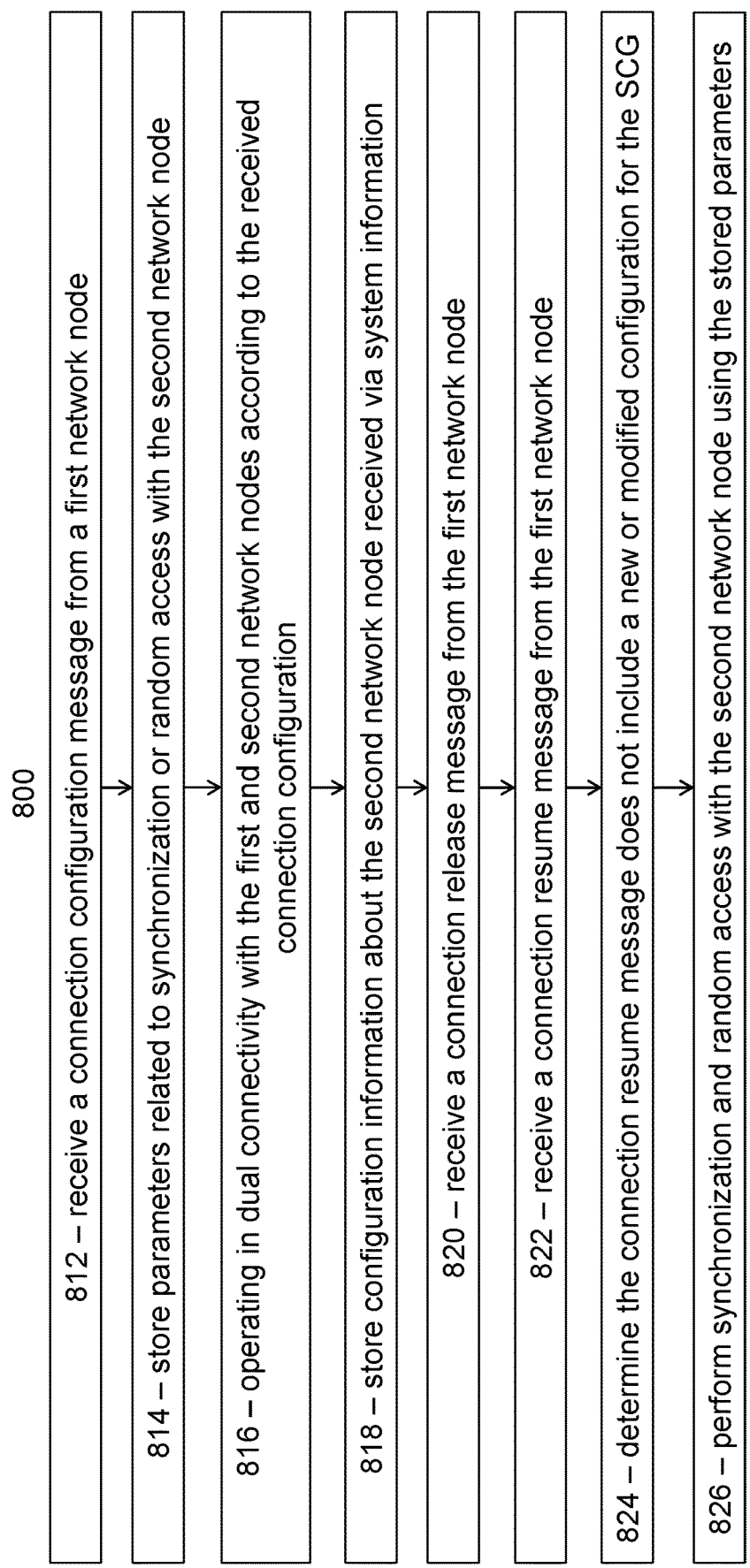
FIG. 8 is flowchart illustrating an example method in a wireless device, according to certain embodiments.

FIG. 8 is a flowchart illustrating an example method in a wireless device, according to certain embodiments. In particular embodiments, one or more steps of FIG. 8 may be performed by wireless device 110 described with respect to FIG. 6. The wireless device is capable of operating in dual connectivity with a first network node in a MCG. and a second network node in a SCG.

The method may begin at step 812, where the wireless device (e.g., wireless device 110) receives a connection configuration message from the first network node (e.g. network node 120). The connection configuration message includes parameters for setup or modification of the SCG.

In particular embodiments, when the second network node is operating in NR, the connection configuration message includes a reconfigurationWithSync information element for the SCG, and when the second network node is operating in LTE, the connection configuration message includes a mobilityControlInfoSCG and a PSCellToAddMod information element for the SCG.

At step 814, the wireless device storing one or more parameters related to synchronization or random access with the second network node. For example, wireless device 110 may store the one or more parameters in its memory.

In particular embodiments, storing one or more parameters related to synchronization or random access with the second network node comprises storing one or more of a random access guard time for the SCG, a wireless device identity used with the SCG, and a dedicated random access configuration for the SCG.

At step 816, the wireless device operates in dual connectivity with the first network node (e.g., master node) and the second network node (e.g., secondary node) according to the received connection configuration.

At step 818, the wireless device stores configuration information about the second network node received via system information. In particular embodiments, storing configuration information about the second network node received via system information comprises, when the second network node is operating in NR, storing servingCellConfigCommon information element from SIB1, and when the second network node is operating in LTE, storing radioResourceConfigCommon information element from SIB2.

After operating in dual connectivity for some amount of time, the secondary cell group may no longer be needed. At step 820, the wireless device receives a connection release message from the first network node. The connection release message instructs the wireless device to transition to an idle/inactive state. In particular embodiments, transitioning to the idle/inactive state comprises saving the stored parameters in a wireless device inactive context.

After another amount of time, the secondary cell group may again be needed. At step 822, the wireless device receives a connection resume message from the first network node. The connection resume message indicates to resume dual connectivity operation with the SCG.

At step 824, the wireless device determines the connection resume message does not include a new or modified configuration for the SCG and at step 826, the wireless device performs synchronization and random access with the second network node using the stored parameters.

Modifications, additions, or omissions may be made to method 800 of FIG. 8. Additionally, one or more steps in the method of FIG. 8 may be performed in parallel or in any suitable order.

Figure 9:
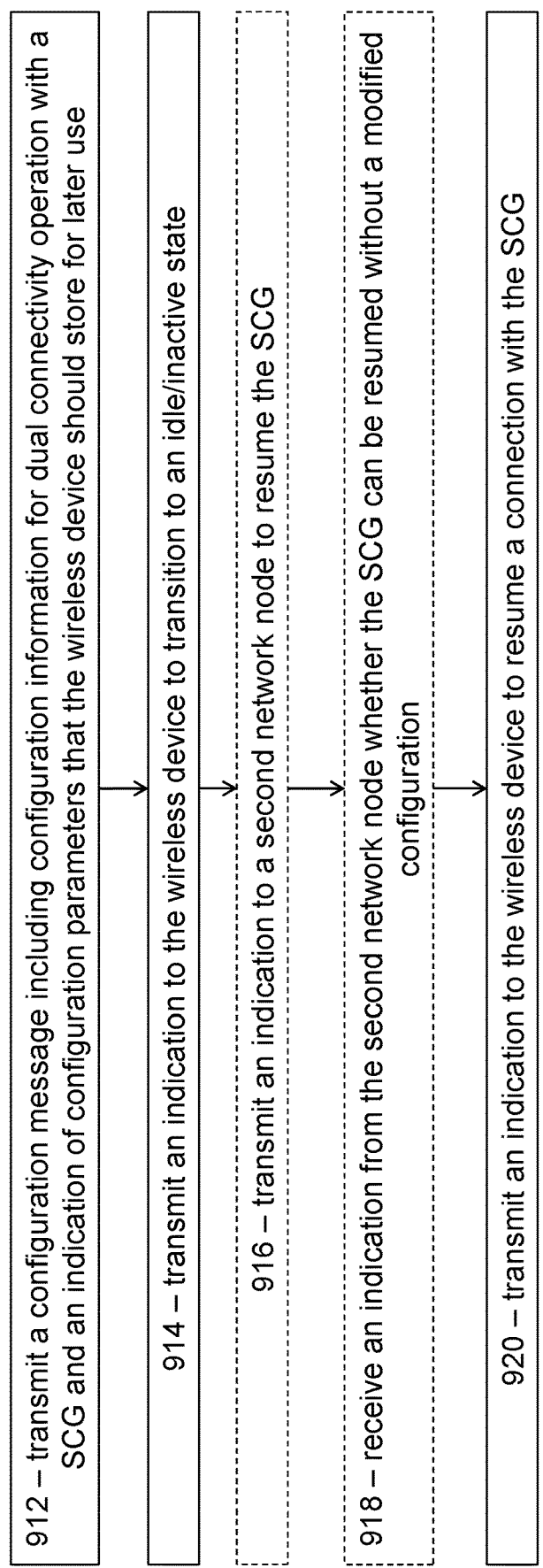
FIG. 9 is flowchart illustrating an example method in a first network node, according to certain embodiments.

FIG. 9 is a flowchart illustrating an example method in a first network node (e.g., master node), according to certain embodiments. In particular embodiments, one or more steps of FIG. 9 may be performed by network node 160 described with respect to FIG. 6.

The method begins at step 912, where the network node (e.g., network node 160) transmits a configuration message to a wireless device. The configuration message includes configuration information for dual connectivity operation with a SCG and an indication of one or more configuration parameters for the SCG that the wireless device should store for later use.

At step 914, the network node transmits an indication to the wireless device to transition to an idle/inactive state. In particular embodiments, the indication to transition to an idle/inactive state includes an indication of one or more configuration parameters for the SCG that the wireless device should store in a wireless device inactive context.

At step 916, the network node may transmit an indication to a second network node to resume the SCG and at step 918 may receive an indication from the second network node whether the SCG can be resumed without a modified configuration.

At step 920, the network node transmits an indication to the wireless device to transition to an idle/inactive state and transmitting an indication to the wireless device to resume a connection with the SCG. In particular embodiments, the indication to transition to resume a connection includes an indication of one or more configuration parameters for the SCG that the wireless device should retrieve from a wireless device inactive context.

Modifications, additions, or omissions may be made to method 900 of FIG. 9. Additionally, one or more steps in the method of FIG. 9 may be performed in parallel or in any suitable order.

Figure 10:
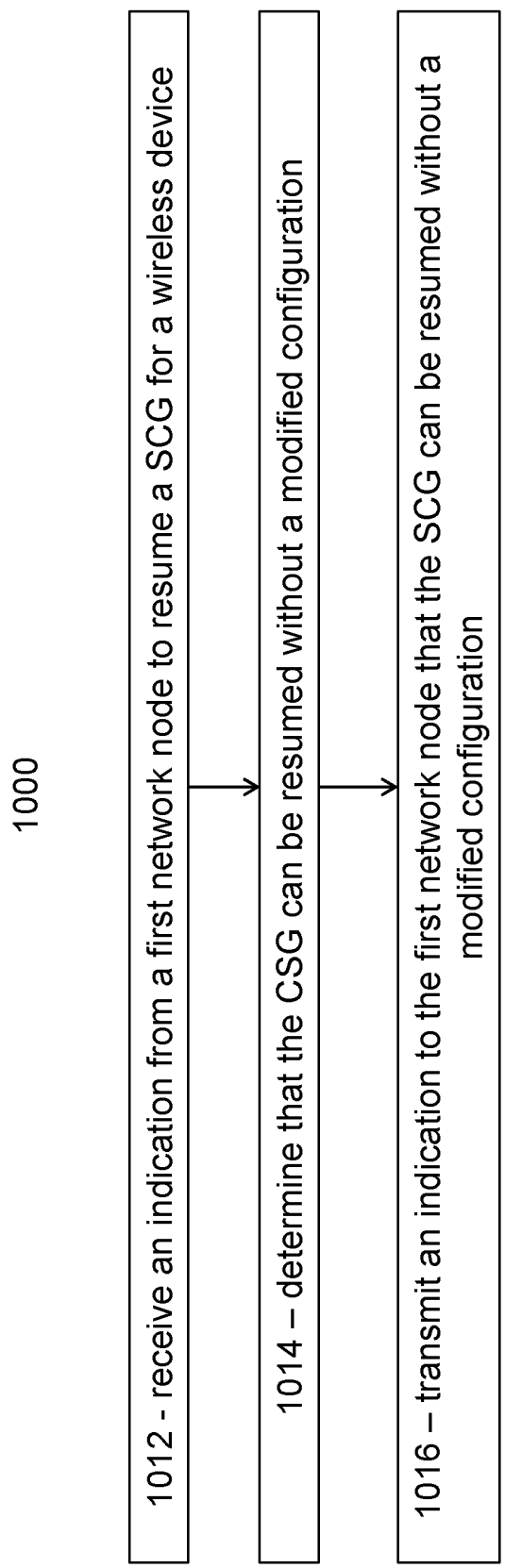
FIG. 10 is flowchart illustrating an example method in a second network node, according to certain embodiments.

FIG. 10 is a flowchart illustrating an example method in a second network node (e.g., secondary node), according to certain embodiments. In particular embodiments, one or more steps of FIG. 10 may be performed by network node 160 described with respect to FIG. 6.

The method begins at step 1012, where the network node (e.g., network node 160) receives an indication from a first network node (e.g., master node) to resume a SCG for a wireless device.

At step 1014, the network node determines that the SCG can be resumed without a modified configuration.

At step 1016, the network node transmits an indication to the first network node that the SCG can be resumed without a modified configuration.

Modifications, additions, or omissions may be made to method 1000 of FIG. 10. Additionally, one or more steps in the method of FIG. 10 may be performed in parallel or in any suitable order.

Figure 11:
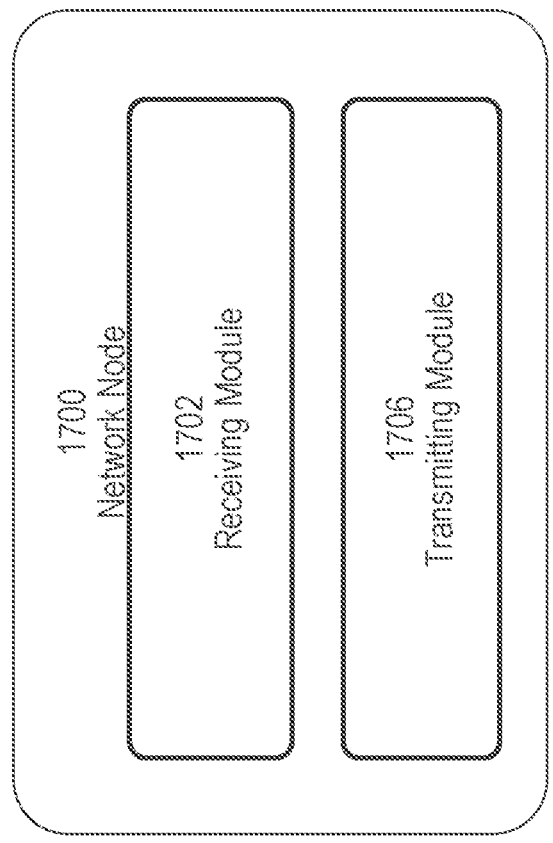
FIG. 11 illustrates a schematic block diagram of a wireless device and a network node in a wireless network, according to certain embodiments.
Figure 11:
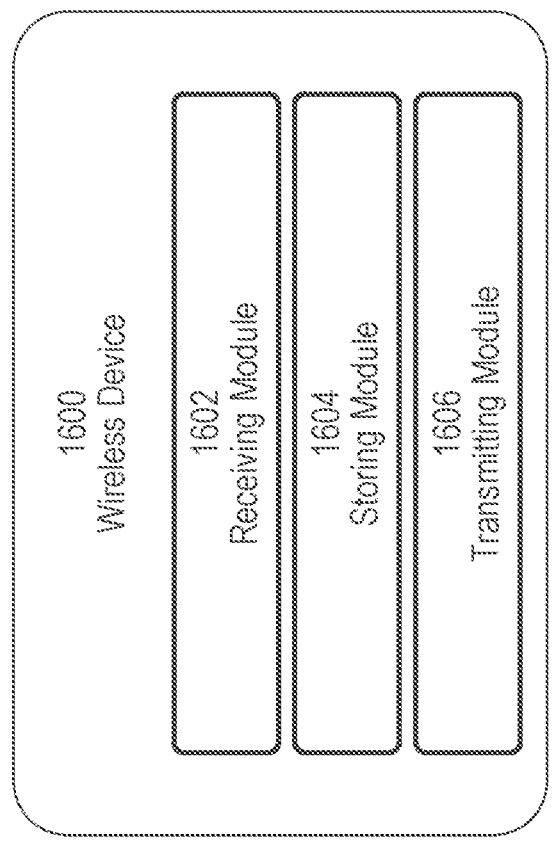

FIG. 11 illustrates a schematic block diagram of two apparatuses in a wireless network (for example, the wireless network illustrated in FIG. 6). The apparatuses include a wireless device and a network node (e.g., wireless device 110 and network node 160 illustrated in FIG. 6). Apparatuses 1600 and 1700 are operable to carry out the example methods described with reference to FIGS. 8-10, and possibly any other processes or methods disclosed herein. It is also to be understood that the methods of FIGS. 8-10 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, storing module 1604, transmitting module 1606, and any other suitable units of apparatus 1600 to perform corresponding functions according one or more embodiments of the present disclosure. Similarly, the processing circuitry described above may be used to cause receiving module 1702, transmitting module 1706, and any other suitable units of apparatus 1700 to perform corresponding functions according one or more embodiments of the present disclosure.

As illustrated in FIG. 11, apparatus 1600 includes receiving module 1602 configured to receive configuration information and connection release/resume messages according to any of the embodiments and examples described herein. Storing module 1604 is configured to store synchronization and random access configuration information according to any of the embodiments and examples described herein. Transmitting module 1606 is configured to transmit responses according to any of the embodiments and examples described herein.

As illustrated in FIG. 11, apparatus 1700 includes receiving module 1702 configured to receive messages according to any of the embodiments and examples described herein. Transmitting module 1706 is configured to transmit messages according to any of the embodiments and examples described herein.

Figure 12:
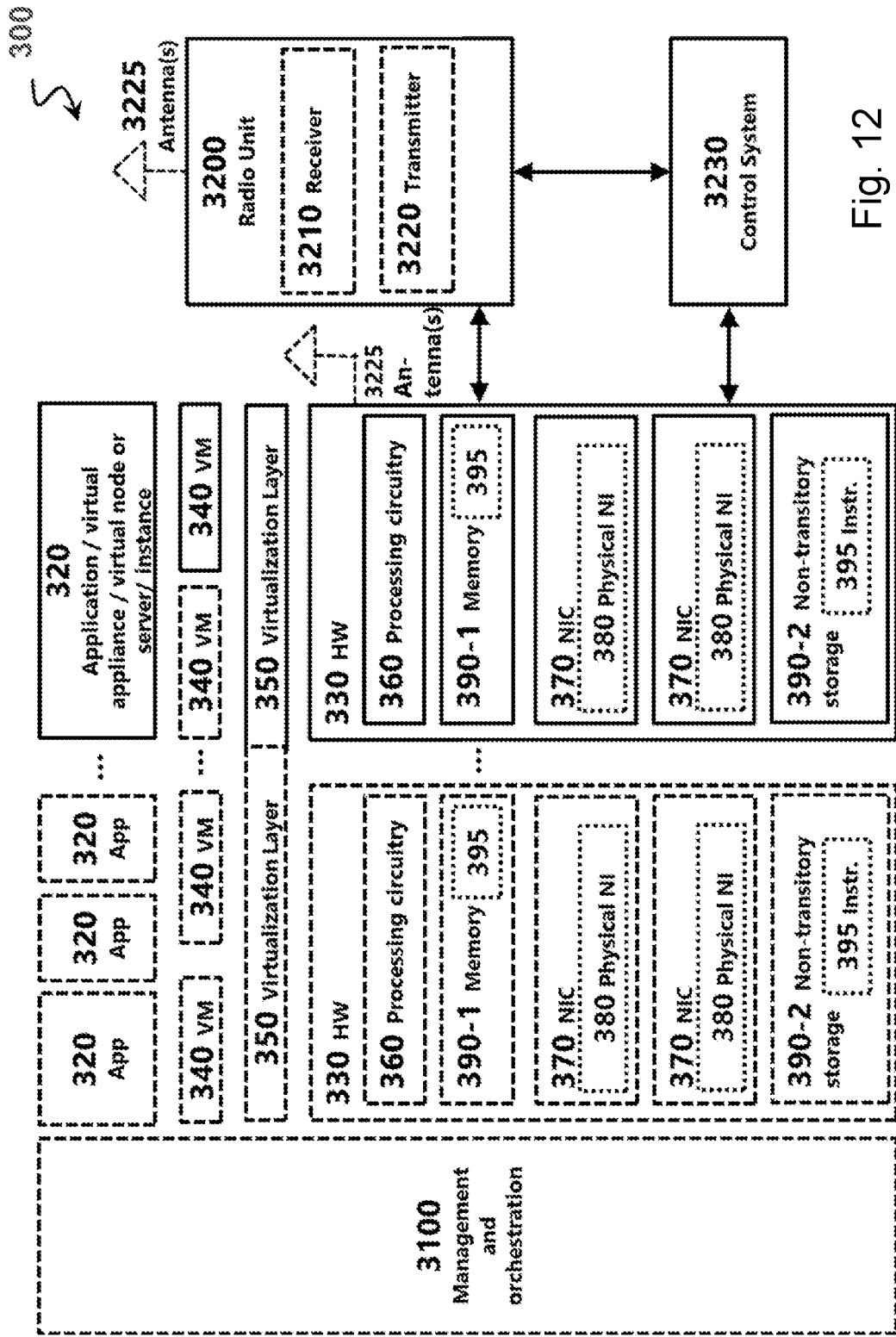
FIG. 12 illustrates an example virtualization environment, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
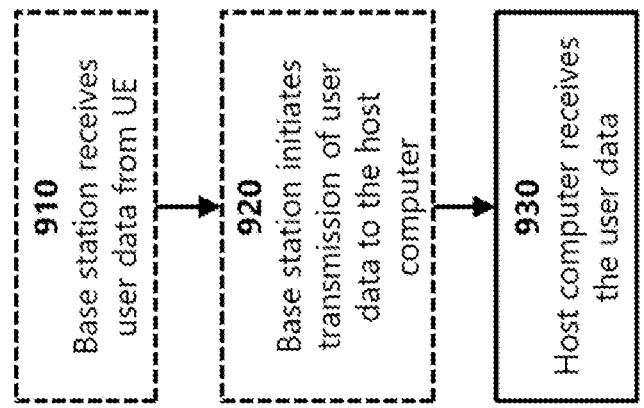
FIG. 18 is a flowchart illustrating a method implemented in a communication system, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas

3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 13:
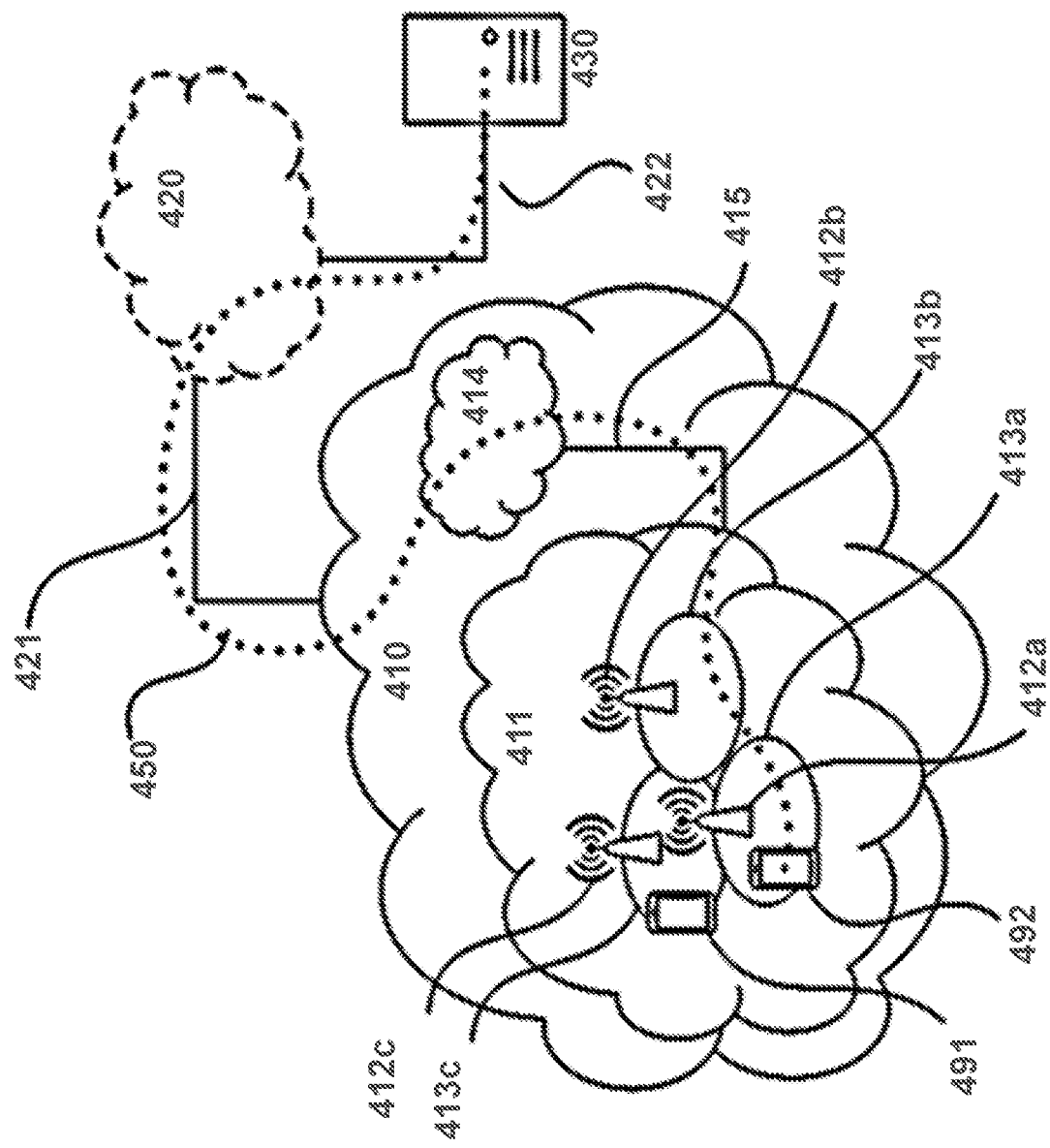
FIG. 13 illustrates an example telecommunication network connected via an intermediate network to a host computer, according to certain embodiments.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
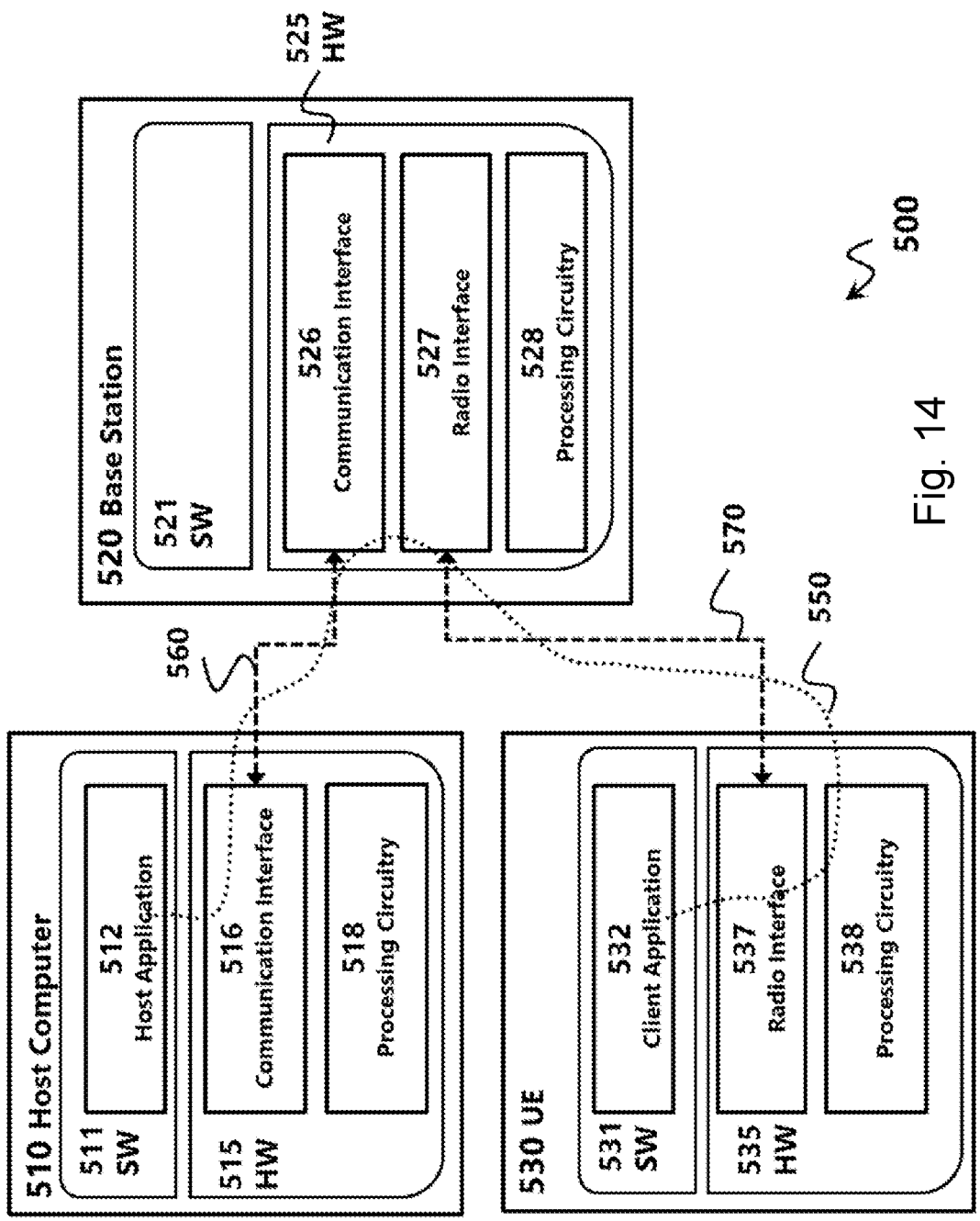
FIG. 14 illustrates an example host computer communicating via a base station with a user equipment over a partially wireless connection, according to certain embodiments.

FIG. 14 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by base station 520. Communication interface 526 may be configured to facilitate connection 560 to host computer 510. Connection 560 may be direct, or it may pass through a core network (not shown in FIG. 14) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 14 may be similar or identical to host computer 430, one of base stations 412a, 412b, 412c and one of UEs 491, 492 of FIG. 12, respectively. This is to say, the inner workings of these entities may be as shown in FIG. 14 and independently, the surrounding network topology may be that of FIG. 12.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 15:
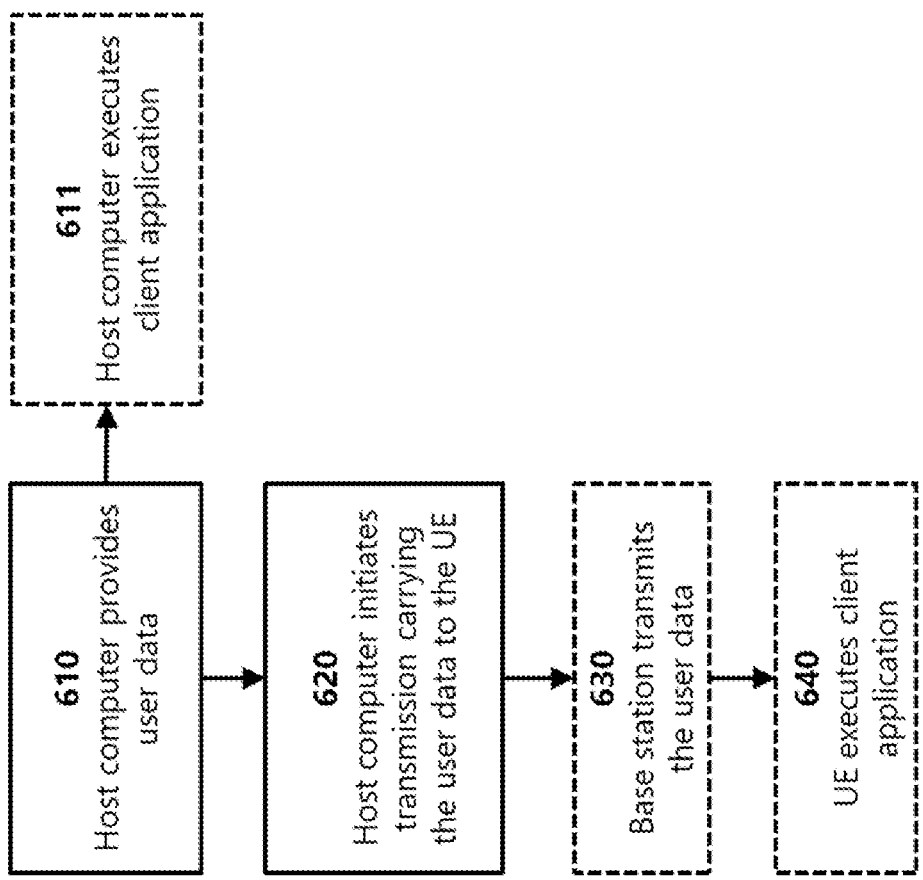
FIG. 15 is a flowchart illustrating a method implemented, according to certain embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 16:
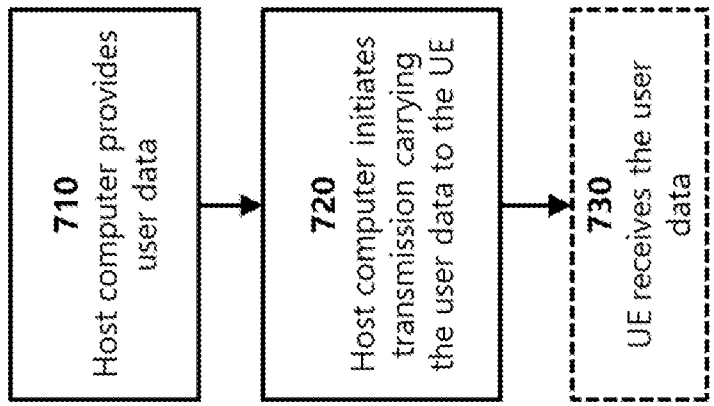
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 17:
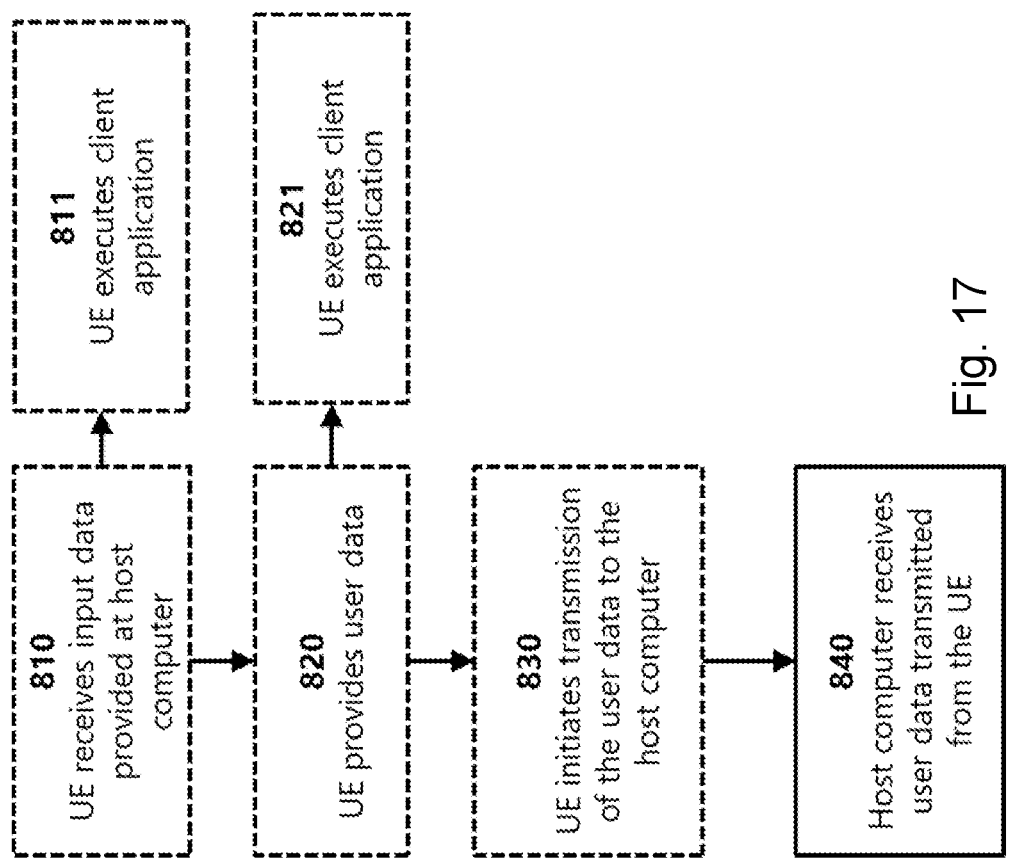
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ACK/NACK Acknowledgment/Non-acknowledgment
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CG Configured Grant
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DCI Downlink Control Information
DFTS-OFDM Discrete Fourier Transform Spread OFDM
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
GF Grant-Free
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MB SFN Multimedia Broadcast multicast service Single Frequency Network
MBSFN ABS MBSFN Almost Blank Subframe
MCS Modulation and Coding Scheme
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SPS Semi-Persistent Scheduling
SUL Supplemental Uplink
SS Synchronization Signal
SSS Secondary Synchronization Signal
TDD Time Division Duplex
TDOA Time Difference of Arrival
TO Transmission Occasion
TOA Time of Arrival
TSS Tertiary Synchronization Signal
TTI Transmission Time Interval
UE User Equipment
UL Uplink
URLLC Ultra-Reliable and Low-Latency Communications
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device capable of operating in dual connectivity with a first network node in a master cell group, MCG, and a second network node in a secondary cell group, SCG, the method comprising:
receiving a connection configuration message from the first network node, the connection configuration message including parameters for setup or modification of the SCG;
storing one or more parameters related to synchronization or random access with the second network node;
operating in dual connectivity with the first network node and the second network node according to the received connection configuration;
storing configuration information about the second network node received via system information, wherein storing configuration information about the second network node received via system information comprises:
when the second network node is NR, storing servingCellConfigCommon information element from system information block 1, SIB1; and
when the second network node is operating in LTE, storing radioResourceConfigCommon information element from system information block 2, SIB2;
receiving a connection release message from the first network node, the connection release message instructing the wireless device to transition to an idle or inactive state, wherein transitioning to the idle or inactive state comprises saving the stored parameters in a wireless device inactive context;
receiving a connection resume message from the first network node, the connection resume message indicating to resume dual connectivity operation with the SCG;
determining the connection resume message does not include a new or modified configuration for the SCG; and
performing synchronization and random access with the second network node using the stored parameters.

2. The method of claim 1, wherein:
when the second network node is operating in new radio, NR, the connection configuration message includes a reconfigurationWithSync information element for the SCG; and
when the second network node is operating in long term evolution, LTE, the connection configuration message includes a mobilityControlInfoSCG and a PSCellToAddMod information element for the SCG.

3. The method of claim 1, wherein storing one or more parameters related to synchronization or random access with the second network node comprises storing one or more of a random access guard time for the SCG, a wireless device identity used with the SCG, and a dedicated random access configuration for the SCG.

4. A wireless device capable of operating in dual connectivity with a first network node in a master cell group, MCG, and a second network node in a secondary cell group, SCG, the wireless device comprising processing circuitry operable to:
receive a connection configuration message from the first network node, the connection configuration message including parameters for setup or modification of the SCG;
store one or more parameters related to synchronization or random access with the second network node;
operate in dual connectivity with the first network node and the second network node according to the received connection configuration;
store configuration information about the second network node received via system information, wherein the processing circuitry is operable to store configuration information about the second network node received via system information by:

when the second network node is operating in NR, storing servingCellConfigCommon information element from system information block 1, SIB1; and when the second network node is operating in LTE, storing radioResourceConfigCommon information element from system information block 2, SIB2;

receive a connection release message from the first network node, the connection release message instructing the wireless device to transition to an idle or inactive state, wherein transitioning to the idle or inactive state comprises saving the stored parameters in a wireless device inactive context;

receive a connection resume message from the first network node, the connection resume message indicating to resume dual connectivity operation with the SCG;

determine the connection resume message does not include a new or modified configuration for the SCG; and perform performing synchronization and random access with the second network node using the stored parameters.

5. The wireless device of claim 4, wherein:

when the second network node is operating in new radio, NR, the connection configuration message includes a reconfigurationWithSync information element for the SCG; and when the second network node is operating in long term evolution, LTE, the connection configuration message includes a mobilityControlInfoSCG and a PSCell-ToAddMod information element for the SCG.

6. The wireless device of claim 4, wherein the processing circuitry is operable to store one or more parameters related to synchronization or random access with the second network node by storing one or more of a random access guard time for the SCG, a wireless device identity used with the SCG, and a dedicated random access configuration for the SCG.

* * * * *